(12) United States Patent
Miyamoto et al.

(10) Patent No.: US 6,283,857 B1
(45) Date of Patent: *Sep. 4, 2001

(54) THREE-DIMENSIONAL IMAGE PROCESSING APPARATUS WITH ENHANCED AUTOMATIC AND USER POINT OF VIEW CONTROL

(75) Inventors: Shigeru Miyamoto; Yasunari Nishida; Takumi Kawagoe; Yoshiaki Koizumi, all of Kyoto (JP)

(73) Assignee: Nintendo Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/858,810

(22) Filed: May 19, 1997

Related U.S. Application Data

(63) Continuation-in-part of application No. 08/836,739, filed on May 15, 1997, now Pat. No. 5,973,704, and a continuation-in-part of application No. 08/719,019, filed on Sep. 24, 1996.
(60) Provisional application No. 60/043,838, filed on Apr. 14, 1997.

(51) Int. Cl.[7] .................................................... A63F 9/22
(52) U.S. Cl. .................................. 463/31; 463/32; 463/7
(58) Field of Search ............................ 463/1, 7, 31, 32, 463/33, 36, 37, 38, 39

(56) References Cited

U.S. PATENT DOCUMENTS

D. 316,879   5/1991   Shulman et al. .
D. 317,946   7/1991   Tse .
D. 357,712   4/1995   Wu .

(List continued on next page.)

FOREIGN PATENT DOCUMENTS 40 18 052   12/1990   (DE) .
268 419      5/1988   (EP) .

(List continued on next page.)

OTHER PUBLICATIONS

*Nintendo Power*, vol. 31, pp. 74–76, PilotWings article, ©1991.
*PilotWings Instruction Booklet*, Super Nintendo Entertainment System, SNS–PW–USA, copyright 1991.

(List continued on next page.)

*Primary Examiner*—Michael O'Neill
(74) *Attorney, Agent, or Firm*—Nixon & Vanderhye P.C.

(57) ABSTRACT

A video game system includes a game cartridge which is pluggably attached to a main console having a main processor, a coprocessor, expandable main memory and player controllers. A multifunctional peripheral processing subsystem external to the game microprocessor and coprocessor is described which executes commands for handling player controller input/output to thereby lessen the processing burden on the graphics processing subsystem. The video game methodology features camera perspective or point of view control features. The system changes the "camera" angle (i.e., the displayed point of view in the three-dimensional world) automatically based upon various conditions and in response to actuation of a plurality of distinct controller keys/buttons/switches, e.g., four "C" buttons in the exemplary embodiment. The control keys allow the user at any time to move in for a close up or pull back for a wide view or pan the camera to the right and left to change the apparent camera angle. Such user initiated camera manipulation permits a player to better judge jumps or determine more precisely where an object is located in relation to the player controlled character.

12 Claims, 35 Drawing Sheets

U.S. PATENT DOCUMENTS

| | | |
|---|---|---|
| D. 363,092 | 10/1995 | Hung . |
| D. 375,326 | 11/1996 | Yokoi et al. . |
| 3,666,900 | 5/1972 | Rothweiler et al. . |
| 3,729,129 | 4/1973 | Fletcher et al. . |
| 3,827,313 | 8/1974 | Kiessling . |
| 4,148,014 | 4/1979 | Burson . |
| 4,161,726 | 7/1979 | Burson et al. . |
| 4,315,113 | 2/1982 | Fisher et al. . |
| 4,359,222 | 11/1982 | Smith, III et al. . |
| 4,469,330 | 9/1984 | Asher . |
| 4,538,035 | 8/1985 | Pool . |
| 4,552,360 | 11/1985 | Bromley et al. . |
| 4,575,591 | 3/1986 | Lugaresi . |
| 4,587,510 | 5/1986 | Kim . |
| 4,659,313 | 4/1987 | Kuster et al. . |
| 4,685,678 | 8/1987 | Frederiksen . |
| 4,748,441 | 5/1988 | Brzezinski . |
| 4,868,780 | 9/1989 | Stern . |
| 4,887,230 | 12/1989 | Noguchi et al. . |
| 4,887,966 | 12/1989 | Gellerman . |
| 4,916,440 | 4/1990 | Faeser et al. . |
| 4,924,216 | 5/1990 | Leung . |
| 4,933,670 | 6/1990 | Wislocki . |
| 4,974,192 | 11/1990 | Face et al. . |
| 4,976,429 | 12/1990 | Nagel . |
| 5,001,632 | 3/1991 | Hall-Tipping . |
| 5,012,230 | 4/1991 | Yasuda . |
| 5,046,739 | 9/1991 | Reichow . |
| 5,160,918 | 11/1992 | Saposnik . |
| 5,203,563 | 4/1993 | Loper, III . |
| 5,207,426 | 5/1993 | Inoue et al. . |
| 5,213,327 | 5/1993 | Kitaue . |
| 5,237,311 | 8/1993 | Mailey et al. . |
| 5,245,320 | 9/1993 | Bouton . |
| 5,259,626 | 11/1993 | Ho . |
| 5,286,024 | 2/1994 | Winblad . |
| 5,290,034 | 3/1994 | Hineman . |
| 5,329,276 | 7/1994 | Hirabayashi . |
| 5,388,990 | 2/1995 | Beckman . |
| 5,390,937 | 2/1995 | Sakaguchi et al. . |
| 5,394,168 | 2/1995 | Smith, III et al. . |
| 5,415,549 | 5/1995 | Logg . |
| 5,421,590 | 6/1995 | Robbins . |
| 5,436,640 | 7/1995 | Reeves . |
| 5,451,053 | 9/1995 | Garrido . |
| 5,459,487 | 10/1995 | Bouton . |
| 5,473,325 | 12/1995 | McAlindon . |
| 5,512,920 | 4/1996 | Gibson . |
| 5,513,307 | 4/1996 | Naka et al. . |
| 5,515,044 | 5/1996 | Glatt . |
| 5,551,693 | 9/1996 | Goto et al. . |
| 5,551,701 | 9/1996 | Bouton et al. . |
| 5,558,329 | 9/1996 | Liu . |
| 5,563,629 | 10/1996 | Caprara . |
| 5,566,280 | 10/1996 | Fukui et al. . |
| 5,589,854 | 12/1996 | Tsai . |
| 5,593,350 | 1/1997 | Bouton et al. . |
| 5,607,157 | 3/1997 | Nagashima . |
| 5,615,083 | 3/1997 | Burnett . |
| 5,624,117 | 4/1997 | Ohkubo et al. . |
| 5,632,680 | 5/1997 | Chung . |
| 5,640,177 | 6/1997 | Hsu . |
| 5,643,087 | 7/1997 | Marcus et al. . |
| 5,649,862 | 7/1997 | Sakaguchi et al. . |
| 5,653,637 | 8/1997 | Tai . |
| 5,663,747 | 9/1997 | Shulman . |
| 5,670,955 | 9/1997 | Thorne, III et al. . |
| 5,680,534 | 10/1997 | Yamato et al. . |
| 5,684,512 | 11/1997 | Schoch et al. . |
| 5,704,837 | 1/1998 | Iwasaki et al. . |
| 5,706,029 | 1/1998 | Tai . |
| 5,714,981 | 2/1998 | Scott-Jackson et al. . |
| 5,734,373 | 3/1998 | Rosenberg et al. . |
| 5,786,807 | 7/1998 | Couch et al. . |
| 5,793,356 | 8/1998 | Svancarek et al. . |
| 5,804,781 | 9/1998 | Okabe . |
| 5,820,462 | 10/1998 | Yokoi et al. . |
| 5,838,330 | 11/1998 | Ajima . |
| 5,862,229 | 1/1999 | Shimizu . |
| B1 4,870,389 | 6/1997 | Ishiwata et al. . |

FOREIGN PATENT DOCUMENTS

| | | |
|---|---|---|
| 431 723 | 6/1991 | (EP) . |
| 0 470 615 | 2/1992 | (EP) . |
| 553 532 | 8/1993 | (EP) . |
| 685 246 | 12/1995 | (EP) . |
| 724 220 | 7/1996 | (EP) . |
| 2234575 | 2/1991 | (GB) . |
| 2 244 546 | 12/1991 | (GB) . |
| 2 263 802 | 8/1993 | (GB) . |
| 50-22475 | 3/1975 | (JP) . |
| 57-18236 | 1/1982 | (JP) . |
| 57-2084 | 1/1982 | (JP) . |
| 57-136217 | 8/1982 | (JP) . |
| 59-40258 | 3/1984 | (JP) . |
| 59-121500 | 7/1984 | (JP) . |
| 61-16641 | 1/1986 | (JP) . |
| 61-198286 | 9/1986 | (JP) . |
| 61-185138 | 11/1986 | (JP) . |
| 2-41342 | 3/1990 | (JP) . |
| 2-68404 | 5/1990 | (JP) . |
| 3-248215 | 11/1991 | (JP) . |
| 4-26432 | 1/1992 | (JP) . |
| 4-20134 | 2/1992 | (JP) . |
| 4-42029 | 2/1992 | (JP) . |
| 4-104893 | 9/1992 | (JP) . |
| 4-291468 | 10/1992 | (JP) . |
| 5-100759 | 4/1993 | (JP) . |
| 5-19925 | 5/1993 | (JP) . |
| 5-177057 | 7/1993 | (JP) . |
| 5-241502 | 9/1993 | (JP) . |
| 6-23148 | 2/1994 | (JP) . |
| 6-54962 | 3/1994 | (JP) . |
| 6-68238 | 3/1994 | (JP) . |
| 6-110602 | 4/1994 | (JP) . |
| 6-114683 | 4/1994 | (JP) . |
| 6-190145 | 7/1994 | (JP) . |
| 6-190147 | 7/1994 | (JP) . |
| 6-205010 | 7/1994 | (JP) . |
| 6-285259 | 10/1994 | (JP) . |
| 6-290277 | 10/1994 | (JP) . |
| 6-315095 | 11/1994 | (JP) . |
| 7-104930 | 4/1995 | (JP) . |
| 7-116343 | 5/1995 | (JP) . |
| 7-178242 | 7/1995 | (JP) . |
| 7-222865 | 8/1995 | (JP) . |
| 7-288006 | 10/1995 | (JP) . |
| 7-317230 | 12/1995 | (JP) . |
| 8-45392 | 2/1996 | (JP) . |
| 62-269221 | 11/1997 | (JP) . |
| WO 92/09347 | 6/1992 | (WO) . |
| WO 94/12999 | 6/1994 | (WO) . |
| WO 97/17651 | 5/1997 | (WO) . |

OTHER PUBLICATIONS

PilotWings, It's a Festival of Flight, Top Secret Password Nintendo Player's Guide, pp. 82–83 and 160, copyright 1991.

PilotWings, Soar with the Flight Club, Super Nintendo Entertainment System Play's Guide, pp. 100–105, copyright 1991.

*Nintendo Power*, vol. 80, pp. 20–27, Jan. 1996.
*Falcon Electronic Battlefield Series*, Advertisement, Spectrum HoloByte, Alameda, California, #F303IBM 208858. (Exhibited at 1992 CES).
*Nintendo Employee Shoshinkai Reports*, 14 pages, Nov. 24–26, 1995.
"Analog Joystick Interface Emulation Using a Digital Counter", IBM technical Disclosure Bulletin, vol. 37, No. 08, Aug. 1994, pp. 73–74.
"Hardware Reset With Microcode Warning Period", *IBM Technical Disclosure Bulletin*, vol. 33, No. 11, Apr. 1991, pp. 105–106.

*3D Ballz Instruction Booklet*, Accolade, San Jose, California, #3050–00231 Rev. A© 1994.
*Knuckles Chaotix Instruction Manual*, Sega, Redwood City, California, #84503 (1995).
*Sega Genesis 32X Instruction Manual*, Sega, Redwood City California, #672–2116 (1994).
*Sega Genesis Instruction Manual*, Sega, Hayward, California,#3701–926–0–01 (1994).
*Sonic 2 The Hedgehog Instruction Manual*, Sega, Hayward, California, #672–0944 3701–925–0–01 (1992).
Sony PlayStation Instruction Manual, and informational materials, Sony Computer Entertainment Inc. 1995.

| 1 BYTE | B | A | G | START | ↑ | ↓ | ← | → |
|---|---|---|---|---|---|---|---|---|
| 2 BYTE | JSRST | O | L | R | E | D | C | F |
| 3 BYTE | \<────────── X ORDINATE ──────────\> | | | | | | | |
| 4 BYTE | \<────────── Y ORDINATE ──────────\> | | | | | | | |

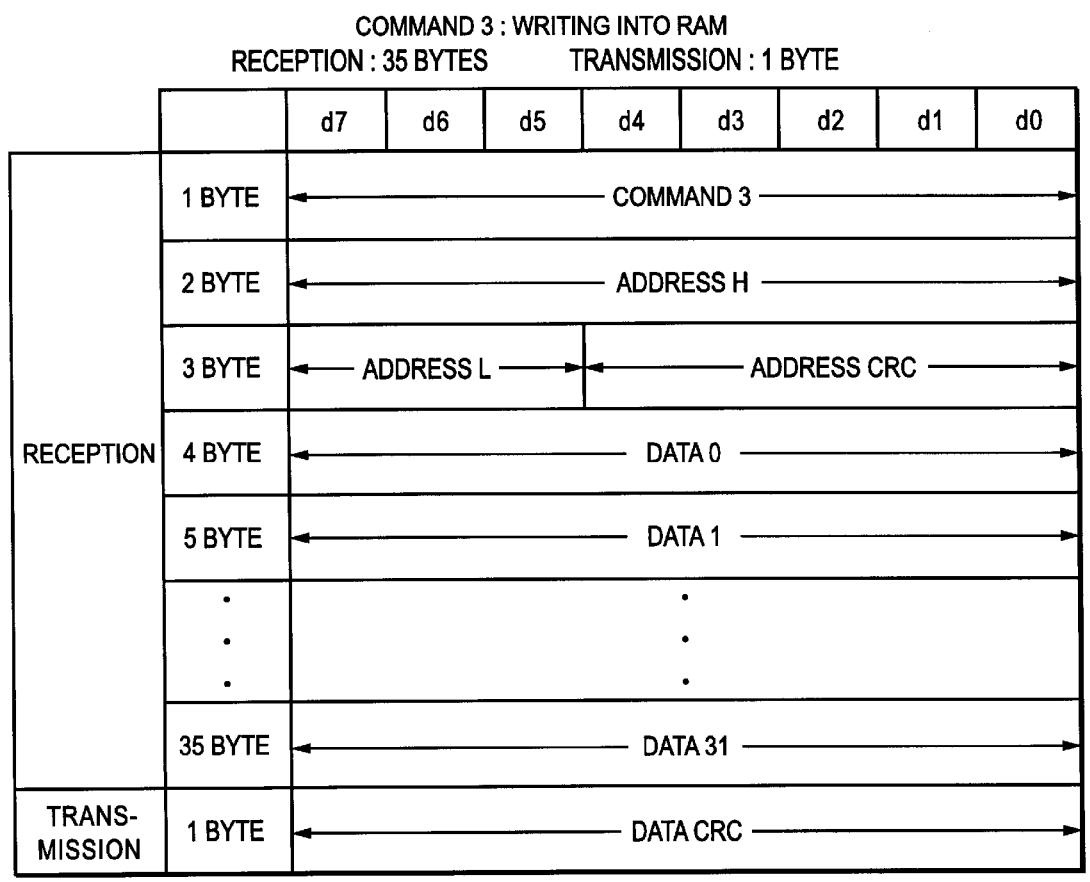

TRIANGLE POLYGON

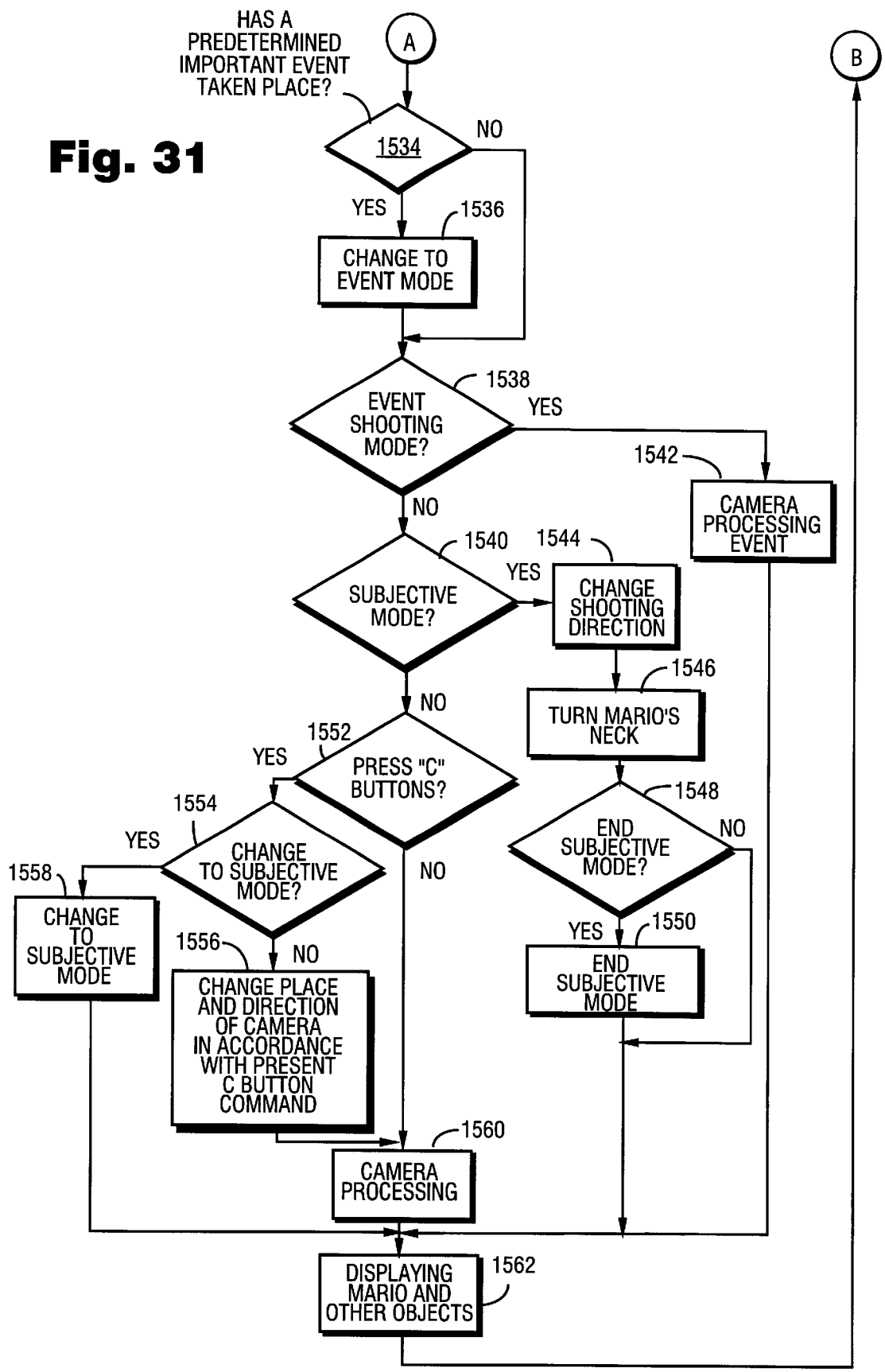

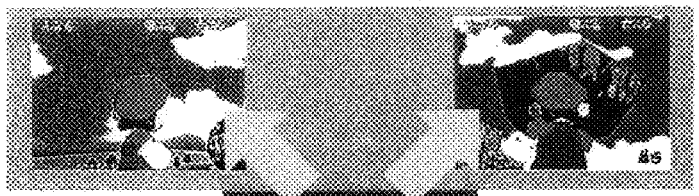
Fig. 32L  Fig. 32K
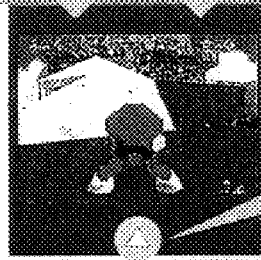
Fig. 32G  Fig. 32F
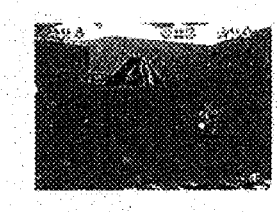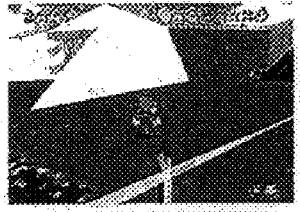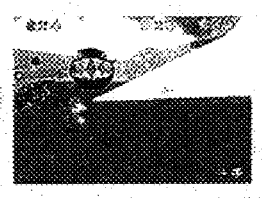
Fig. 32H  Fig. 32J
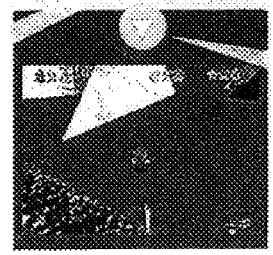
Fig. 32I

DUNGEON OR ROOM

THREE-DIMENSIONAL IMAGE PROCESSING APPARATUS WITH ENHANCED AUTOMATIC AND USER POINT OF VIEW CONTROL

This application is a continuation-in-part of application application Ser. No. 08/836,739 filed May 15, 1997, now U.S. Pat. No. 5,973,704 and entitled "Three-Dimensional Image Processing Apparatus" and is a continuation-in-part of copending U.S. Application Ser. No. 08/719,019 filed Sep. 24, 1996 (the '019 application), and entitled Operation Controlling Device and Video Processing System Used Therewith", and provisional application No. 60/043,838, filed Apr. 14, 1997, which is incorporated herein by reference.

FIELD OF THE INVENTION

This invention relates to a three-dimensional image processing is apparatus and an external memory device to be used therewith. More particularly, the invention relates to a three-dimensional image processing apparatus which is adapted to display an image of a player controlled object or other objects, existing in three-dimensional space, when viewed from predetermined points of view.

BACKGROUND AND SUMMARY OF THE INVENTION

The conventional so-called three-dimensional (3D) game uses player controlled or operable objects (objects controllable by an operator) configured with three-dimensional data when viewed by an apparent camera at predetermined angles and distances, thereby obtaining displayed images. In the conventional game, however, if a background image (e.g., a wall) or an object used as an opponent character (e.g., a programmed controlled object) comes between the player controlled operable object and the "camera", or if another object is moved to interrupt the line of sight between the operable object and the camera, the operable object can not be viewed in the three-dimensional world. To this end, there has been a limitation in conventional 3D games in that the other object has to be arranged by program not to exist between the operable object and the camera.

It is therefore an object of the present invention to provide an image processing apparatus which is capable of displaying an operable object at substantially all times and is hence free from limitation in arranging other objects.

The illustrative image processing apparatus displays an operable object image and another object existing in a three-dimensional space from a predetermined viewing or "photographic" position. The system includes an external memory which stores operable object and other object data and a video game program. The system uses a unique player controller which inputs data that alters the position of the operable object in the three-dimensional space.

Operable object position data generating hardware and software generates operable object position data so as to alter the position of the operable object in the three-dimensional space based on the data input by the controller. Three-dimensional data is created based on the data stored in the external memory and the operable object pogition data. Point of view position data is generated representing a photographing position in the three-dimensional space for displaying the operable object. The system detects whether or not another object exists between the "camera" view position and the operable object position. If so, the system alters the photographing position data such that the other object is not existent between the photographing position and the operable object position. A three-dimensional display is created for displaying the image of the operable object photographed from a predetennined position in the three-dimensional space.

The system determines whether there is a possibility of a collision between the operable object and a polygon plane of the other object. If there is a possibility of a collision between the operable object and the other object, the camera position is changed, so that the other obiect does not exist between the operable object and the camera. Therefore the operable object is viewed without interference by another object.

In accordance with the present invention, even if another object is permitted to freely move, it is possible to display at substantially all times an operable object on a display screen. Consequently, if the present invention is applied to a game apparatus, the operable object can be displayed at all times on a display, even for a game that involves an operable object and a number of other objects moving around on the display screen.

The present video game methodology uses plural "camera" (i.e., the displayed point of view in the three-dimensional world) modes and embodies automatic manipulation of the "camera" angle in response to the user's actuation of a plurality of distinct controller keys/buttons/switches, e.g., four "C" buttons in the exemplary embodiment, the detected position of the player controlled character, and the occurrence of predetermined special events during game play. By utilizing varied camera modes game play occurs with more realistic varied image expression. The invention permits the player controlled object to be displayed and manipulated such that the player has enhanced character controllability. Through the capability of displaying a scene from all directions a player is enable to discover, for example, an enemy hiding behind an object, or around a bend, etc. As explained herein, through the use of a unique controller joystick, the player also has an opportunity to control the camera angle to gain a fuller understanding of the surrounding terrain and position in the three-dimensional world.

The control keys allow the user at any time to move in for a close up or pull back for a wide view or pan the camera to the right and left to change the apparent camera angle. Such user initiated camera manipulation permits a player to better judge jumps or determine more precisely where an object is located in relation to the player controlled character. For example, one camera perspective control button allows the user to switch to a perspective which is adjusted to be directly behind the player controlled character. In this fashion, portions of the game where there is a very narrow platform or enclosed space which must be traversed, may be more successfully traversed. The shooting direction may be changed by operation of the unique controller's joystick to change the direction of the character's head to smoothly control direction shifts in which the player wants to see. By utilizing the ability to switch three-dimensional display perspectives, a player can advantageously enhance success in the game by gaining a better angle to attack a jump, navigate a narrow ledge or discover what is around a corner. Thus, a player may achieve a higher score than otherwise would be possible by judicially changing the camera angle.

In accordance with an exemplary embodiment of the present invention, the present video game system automatically changes the apparent moving direction of the camera or modifies the apparent camera angle depending upon the controlled character's circumstance, e.g., is he inside a castle, outside a castle, inside a room, running, flying, swimming, etc. In instances where the game processor detects that, for example, a wall exists between, for example, the player controlled character and a camera point of view, a calculation is made as to the required camera movement to prevent obstruction between the eye of the camera and the operable object. The camera is then moved to a new position in accordance with the calculated moving angle. The camera perspective is automatically changed to select the best camera angle according to the character's circumstances so the player can enjoy the visual effects being experienced in a three-dimensional world.

The above and other objects, features, aspects, and advantages of the present invention will become more apparent from the ensuing detailed description of the present invention when taken in conjunction with the accompanying drawings.

BRIEF DESCRIPTION OF THE DRAWINGS

FIG. 14 shows illustrative transmission and reception data when a command "3" is transmitted from the controller control circuit;

FIGS. 30 and 31 are flowcharts depicting camera mode processing;

FIGS. 32F–32L exemplify screen displays which may be generated by a player actuating one of the FIGS. 6 control keys to initiate a change in camera perspective;

DETAILED DESCRIPTION OF THE DRAWINGS

Figure 1:
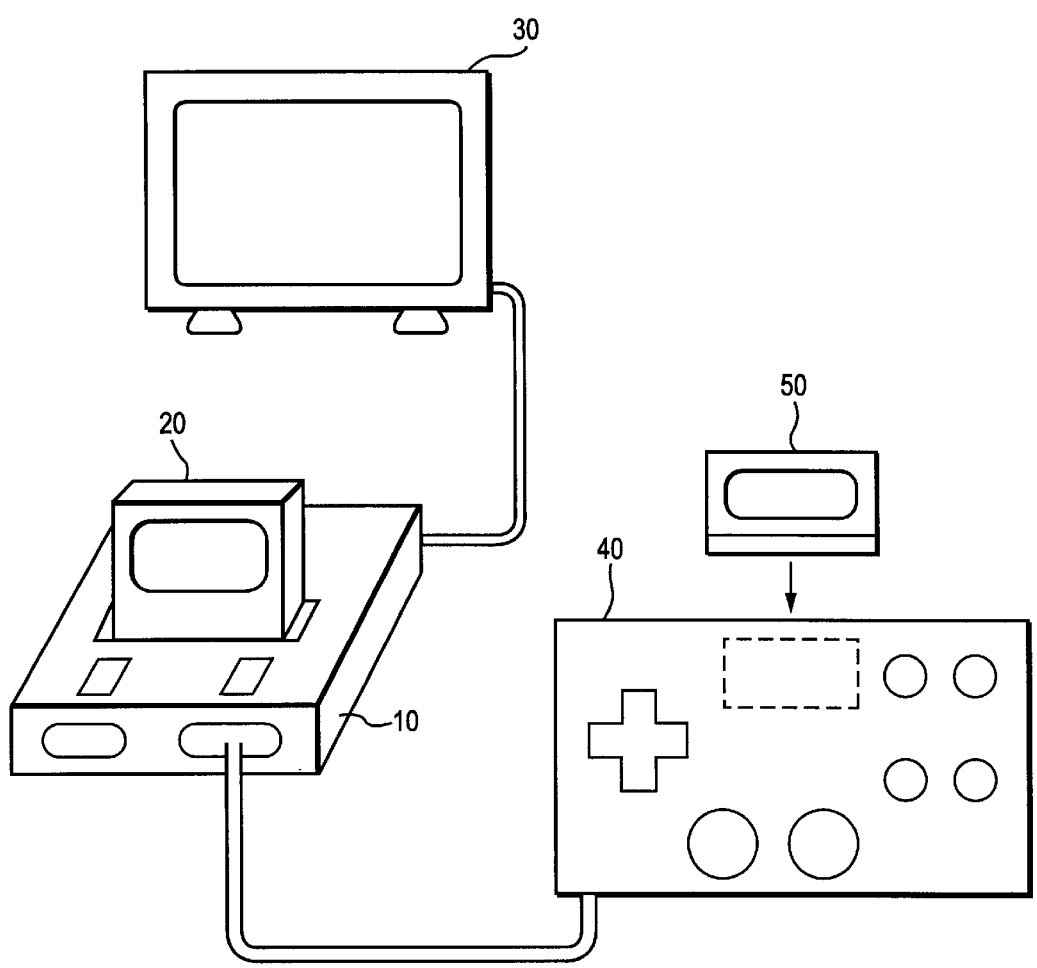
FIG. 1 is an illustrative schematic external view showing one embodiment of an exemplary image processing system.

FIG. 1 depicts an exemplary system implementation of an image/video processing device 10 and controller 40 in accordance with the present invention. An illustrative video or image processing device 10 and system for use with the particular controllers described herein is the Nintendo 64® which is disclosed in copending application Ser. No. 08/562, 288 (the '288 application) entitled "High Performance/Low Cost Video Game System With Multi-functional Peripheral Processing Subsystem", which application is incorporated herein by reference. The video processing device 10 has a connector situated in its top, into which a cartridge 20 is inserted. The cartridge houses a printed circuit board which can be electrically connected with the video processing device 10 by being connected to the FIG. 2 cartridge connector 13 to permit the cartridge to transmit and receive data. An external ROM device, which stores data and programs, etc., and, if desired, a read/write memory device, such as a RAM, are mounted on this board to store program instructions and data processed by the video processing device 10. A CD ROM or a magnetic disc may alternatively be employed in place of the ROM cartridge. When image processing in accordance with an exemplary embodiment described herein is applied to a personal computer, an input device such as a keyboard or a mouse may be used as the operation control mechanism.

Figure 2:
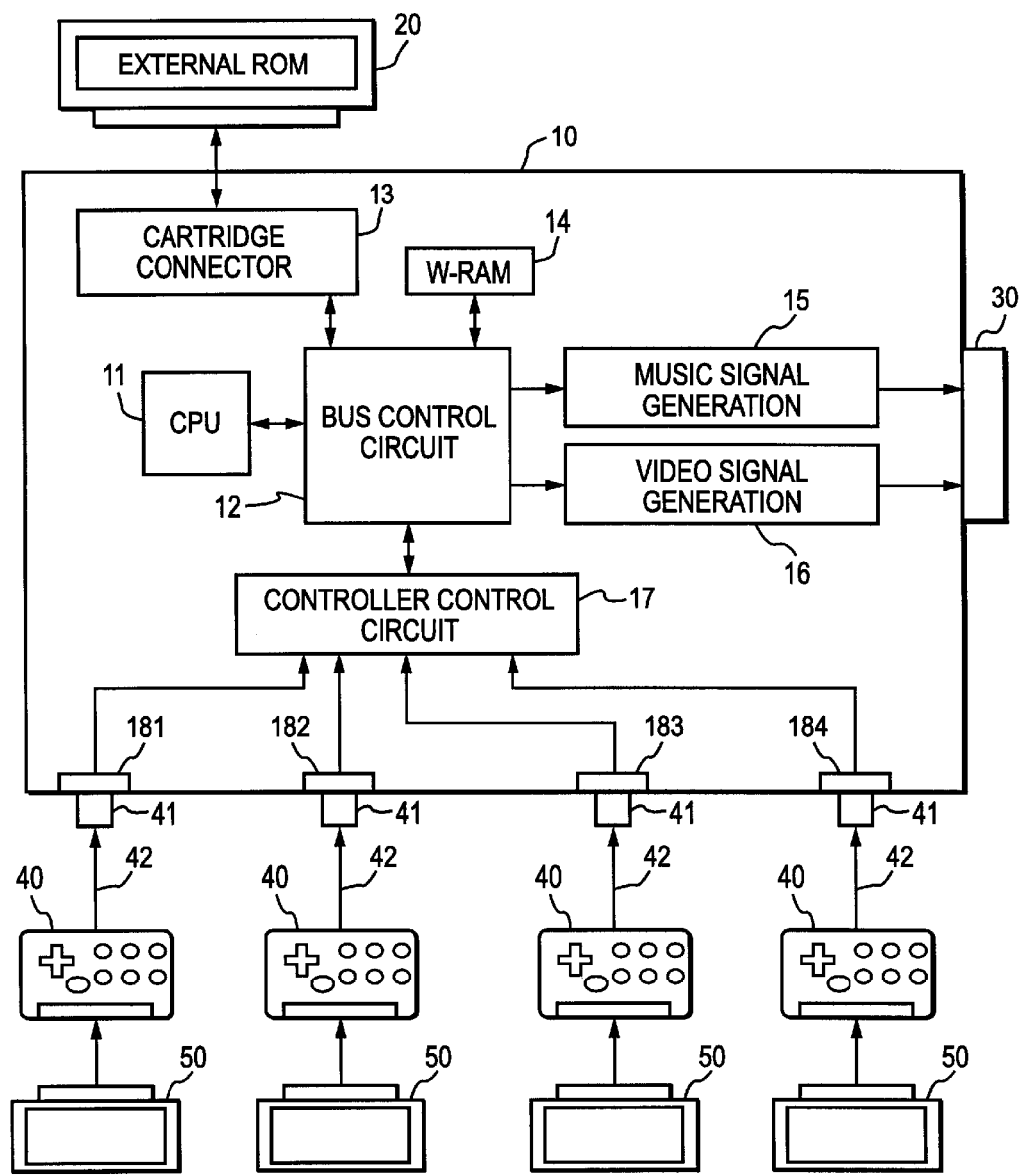
FIG. 2 is an exemplary block diagram of an image processing apparatus in the FIG. 1 embodiment.

As shown in FIG. 2, controller connectors 181–184 are situated on the front surface of the video processing device 10 for connecting up to four controllers 40. By coupling a controller 40 to a controller connector 181–184, the video processing device 10 is electrically connected with the controller 40, making it possible to send and receive data to and from the controller 40. The controller 40 is coupled by a cable 42 to a connection jack 41 for the purpose of connecting to controller connector 181–184 situated in the video processing device 10. The controller 40 is shaped so that it can be grasped by one or both hands, and includes a vertically upright operation member and various control and data entry buttons, which are described below, and which generate electrical signals by being pressed.

Figure 3:
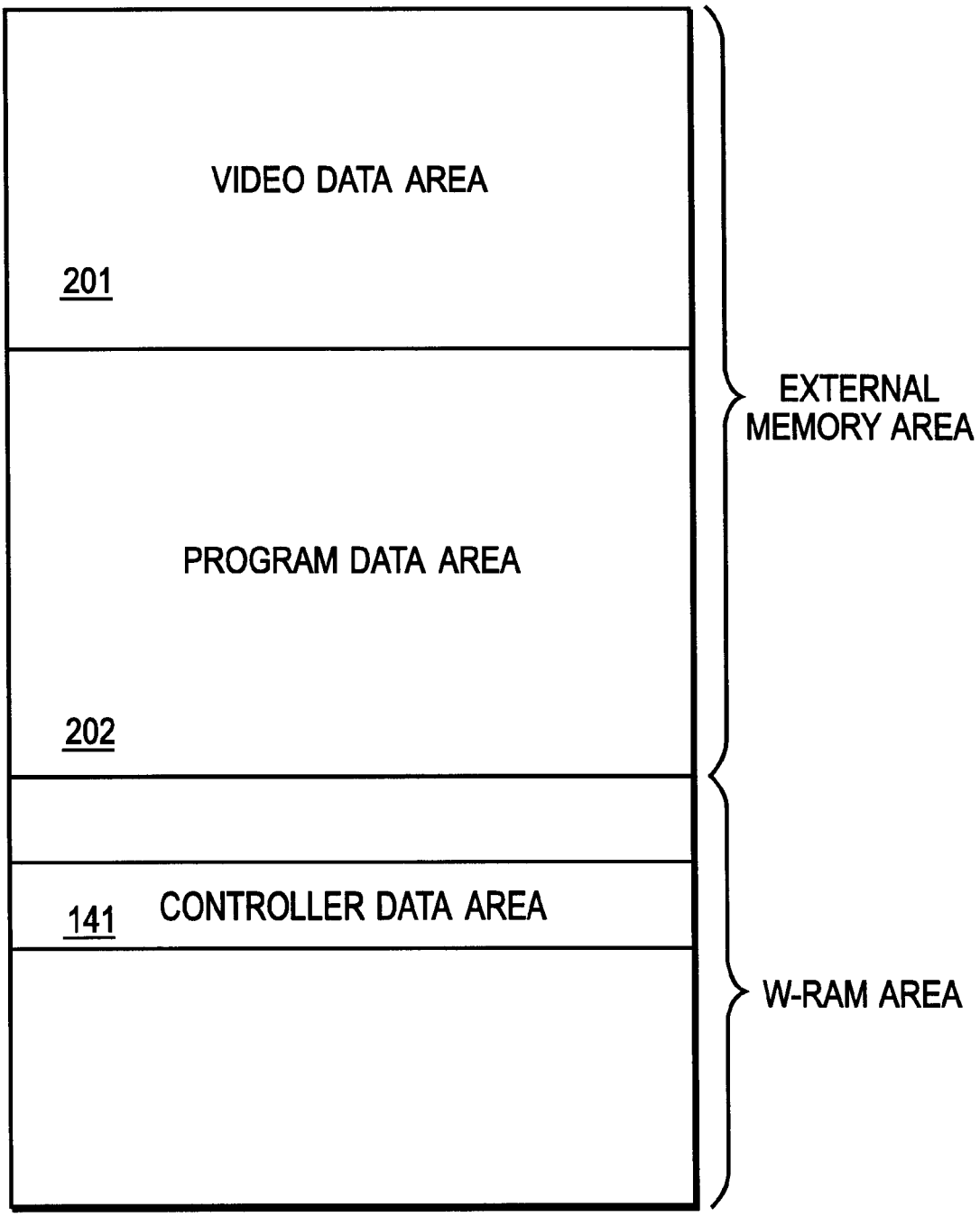
FIG. 3 is an illustrative view showing a CPU memory map for use in the FIG. 2 embodiment, showing an external memory and a W-RAM address space.

Referring to the FIG. 2 exemplary schematic block diagram, the video/image processing device 10 and cartridge 20 are, in use, coupled to display unit 30 (e.g., a television receiver or CRT, etc.) as shown in FIG. 1. The cartridge 20, display unit 30 and controllers 40 are connected to the chassis of the video processing device 10. The cartridge 20 is connected to the cartridge connector 13, for connecting the external ROM and read/write memory inside the cartridge 20 to a bus control processing circuit 12 via an address bus and a data bus, enabling the exchange of data. The video processing device 10 includes a CPU 11 for controlling video processing according to a program which is stored in the external memory built into the cartridge 20 which is inserted into video processing device 10. The CPU 11 may, for example, be a RISC microprocessor such as the MIPS® 4300 RISC microprocessor. FIG. 3 shows an exemplary CPU 11 memory map which includes an external memory address space, e.g., of the ROM cartridge, and which includes a video data area 201, in which image data are stored required for the video processing device 10 to generate the video signals, and a program data area 202, in which the program data are stored required for the CPU 11 to perform the desired operations. In the program data region 202, there is stored an image display program for performing image display based on image data stored at 201, a time-measuring program for carrying out times measurements, and a program for determining whether the cartridge 20 and an extension or expansion device to be described below have a predetermined relationship. The relevant details of the time-measuring program and the determination program are described below. The CPU address space also includes a control pad data area 141 for temporarily storing control pad operating state data, embodied within a work RAM address area which may be part of a main memory address space. In addition, various bus control processing circuit 12 registers, controller control circuit 17 memory devices, etc., are mapped into the main processor address space.

In an exemplary embodiment of the present invention, a bus control processing circuit 12 also is connected to CPU 11. The bus control processing circuit 12 is connected by a parallel bus to the cartridge connector 13, W-RAM 14, a music signal generation circuit 15 and a video signal generation circuit 16, and is connected by a serial link to a controller control circuit 17. The bus control processing circuit 12 inputs commands output as parallel signals from the CPU 11 via the bus, performs parallel/serial conversion, outputs commands as serial signals to the controller control circuit 17, and converts the serial signal data input from the controller control circuit 17 into parallel signals and outputs such signals to the bus. As described in the above-identified incorporated '288 application, the bus control processing circuit (coprocessor 200 therein) may perform a wide range of graphics processing functions in addition to the controller related and other processing functions described herein. The bus control processing unit is a coprocessor which cooperates with CPU 11 to execute the video game/videographics program stored in the removable memory media. The controller 40 data which has been output to the bus control processing unit is appropriately processed, e.g., by the CPU 11, or is stored in WRAM 14. Videographics processing within video processing device 10 may take place in accordance with above-identified copending application Ser. No. 08/562,288, which has been incorporated herein by reference.

The W-RAM device 14 is the memory for temporarily storing data for processing by CPU 11, and is connected with the bus control processing circuit 12 via an address bus and a data bus, making it possible for data to be read and written via the bus control processing circuit. The exemplary FIG. 3 memory map shows the W-RAM as including a control pad data area. The W-RAM 14 may be part of the CPU 11 main memory which may be of the type shown in the above-identified copending application Ser. No. 08/562,288.

The music signal generation device 15 is a circuit which generates a music signal according to commands from the CPU 11 via the bus control processing circuit 12. The video signal generation device 16 is a circuit which generates a video signal according to commands from the CPU 11 via the bus control processing circuit 12.

Figure 4:
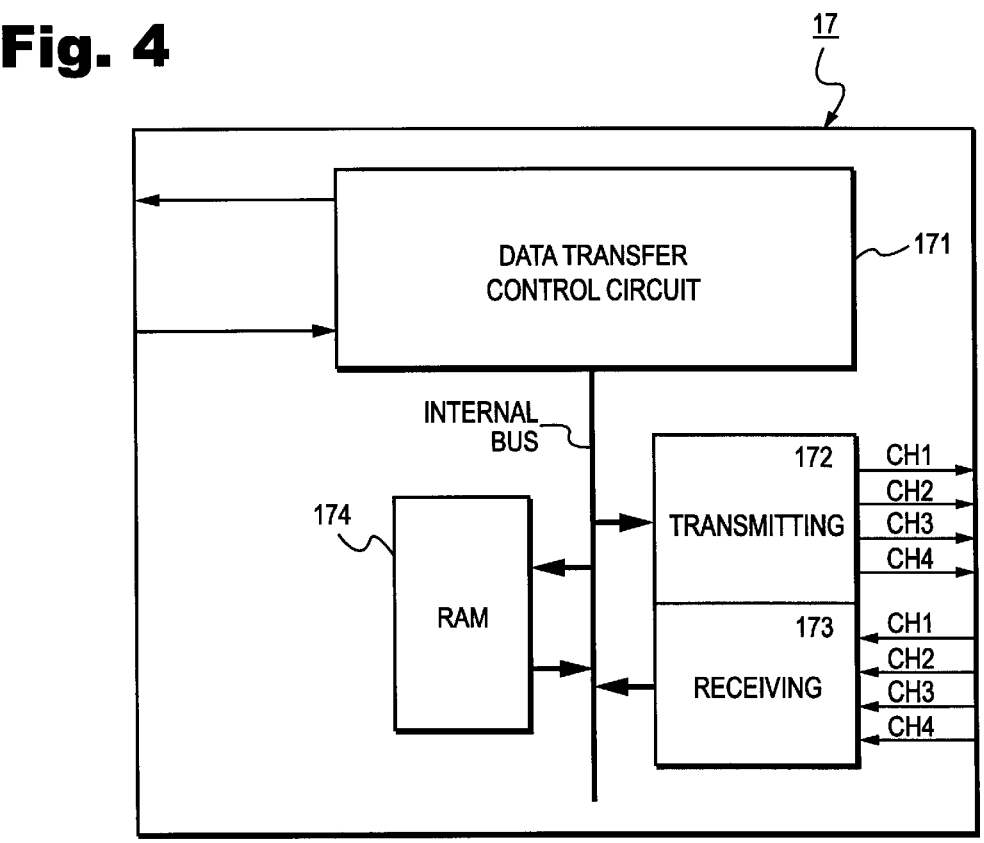
FIG. 4 is a block diagram showing an exemplary controller control circuit in the FIG. 2 embodiment.

The controller control circuit 17 sends and receives serial data to and from the bus control processing circuit 12 and the controller connectors 181–184. FIG. 4 shows an exemplary controller control circuit 17 which includes a data transfer control circuit 171. Data transfer control circuit 171 includes a parallel/serial converter circuit and a serial/parallel converter circuit for receiving serial data from the bus control processing circuit 12 via the serial/parallel converter circuit. In addition, data transfer control circuit 171 is connected to a transmitting (send) circuit 172, receiving circuit 173 and the RAM 174 via an internal bus. The data transfer control circuit 171 is able to send and receive data as a parallel signal over the internal bus. Consequently, the data transfer control circuit 171 is able, based on commands from the bus control processing circuit 12, to read the data in RAM 174 and send it to the bus control processing circuit 12, and to receive data from the bus control processing circuit 12 and write it to RAM 174 as explained in detail in incorporated copending application Ser. No. 08/562,288.

The transmitting/send circuit 172 converts the parallel signals from the internal bus into serial signals and couples such signals to a selected channel CH1–CH4, which are connected to respective controller connectors 181–184, enabling serial signals to be sent to a respective controller 40.

The receiving circuit 173 receives a serial signal from a controller 40 and outputs the received data as a parallel signal to the internal bus. The signal wires CH1–CH4 are each connected to respective controller connectors 181–184, enabling them to receive serial data from the respective controller 40 to which they are connected.

Figure 5:
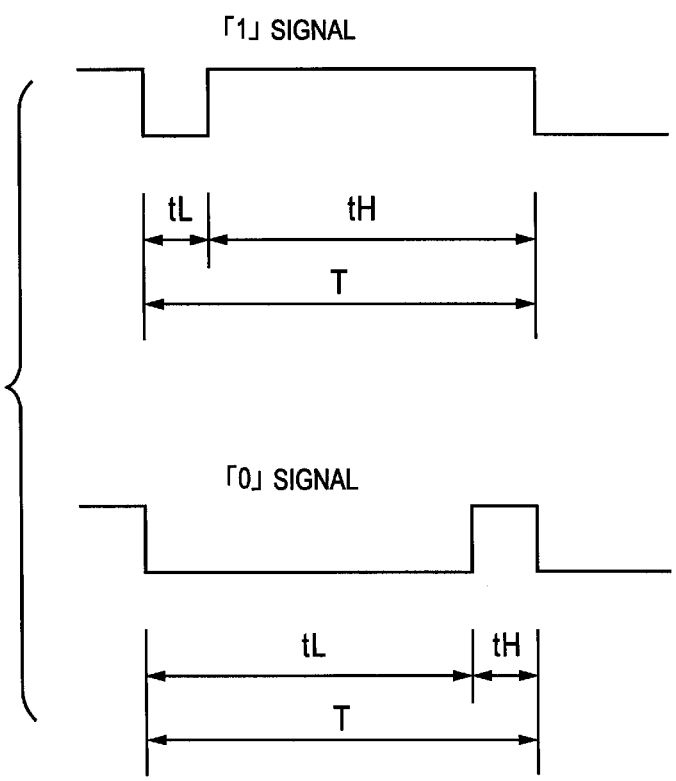
FIG. 5 is an illustrative view for explaining a modulating and demodulating method.

The signal transmitting circuit 172 and the signal receiving circuit 173 adopt a duty-cycle modulation and demodulation (hereinafter referred to as "modulation/demodulation") method as one example of the modulation/demodulation methodology that may be employed here. The duty-cycle modulation/demodulation method, as shown in FIG. 5, is a modulation/demodulation method wherein "1" and "0" are represented by varying a Hi time period and a Lo time period for a signal at a certain interval. Explaining the modulation/demodulation method in more detail, when data to be transmitted in serial is a logical "1", a signal having, within one cycle period T, a high-level period of tH rendered longer than a low-level period tL (tH>tL) is transmitted, while when data to be transmitted is a logical "0" a signal having, within one cycle period T, tH rendered shorter than tL (tH<tL) is transmitted.

The demodulation method samples on a serial signal received (bit transmission signal) so as to monitor at all times whether the received signal is at a high level or a low level, wherein one cycle is expressed as T=tL+tH provided that time period of low till change to high is tL and the time period of high till change to low is tH. In this case, the relationship of tL and tH being tL<tH is recognized as logical "1", while tL>tH is recognized as logical "0", thereby achieving demodulation. If a duty-cycle modulation/demodulation method like this is employed, there is no necessity of transmitting data in synchronism with a clock signal, offering an advantage that transmission and reception of data are available with only one signal line, if two signal lines are available another modulation/demodulation method may be utilized.

Figure 6:
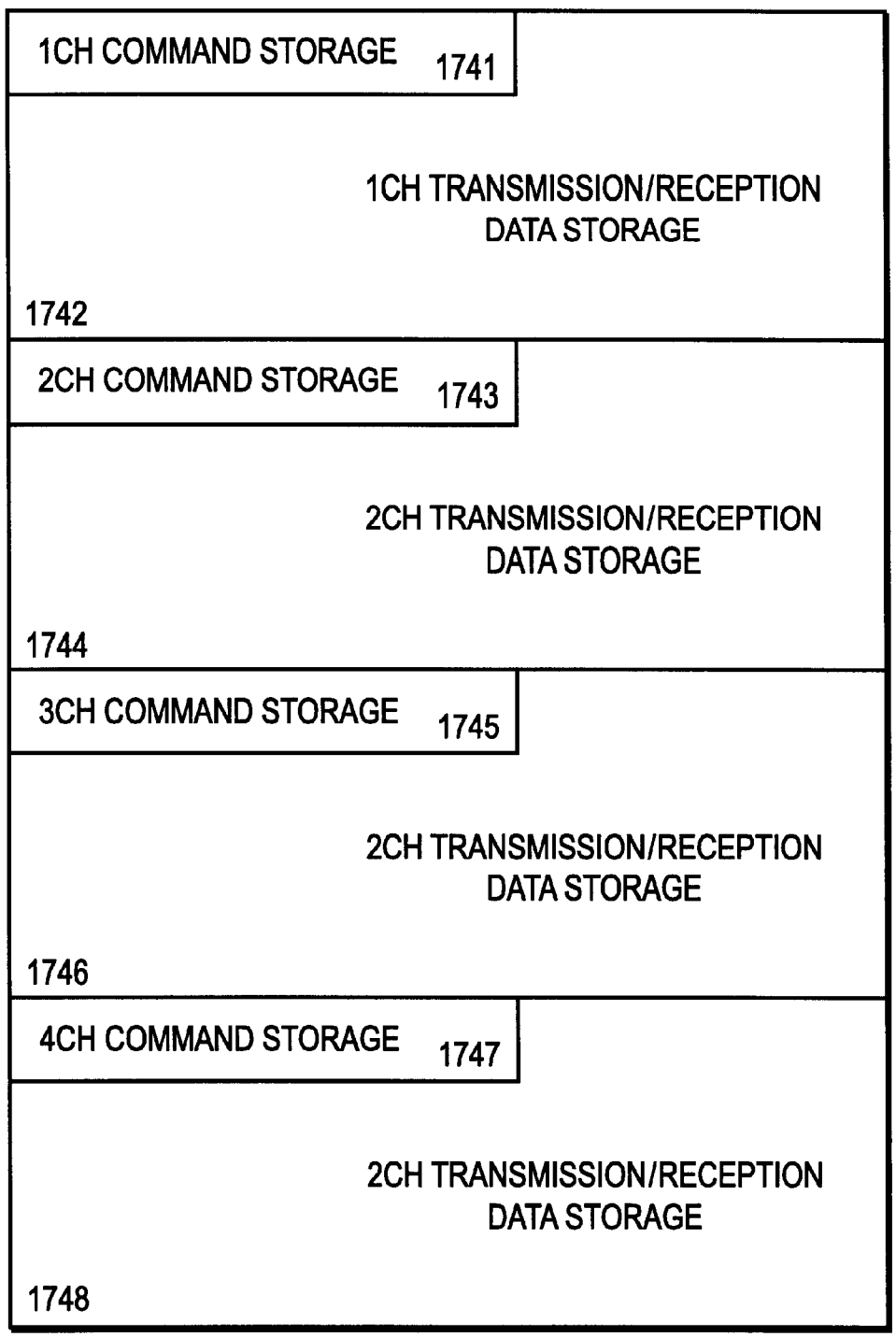
FIG. 6 is an illustrative view showing a memory map of a RAM in FIG. 4.

The RAM 174 is connected to the data transfer control circuit 171 via the internal bus, enabling it to input and output parallel data. The data stored in RAM 174 is structured as explained in the FIG. 6 illustrative memory map. The channel 1 commands are stored in area 1741. The channel 1 transmission data and reception data are stored in area 1742. The channel 2 commands are stored in area 1743. The channel 2 transmission data and reception data are stored in area 1744. The channel 3 commands are stored in area 1745. The channel 3 transmission data and reception data are stored in area 1746. The channel 4 commands are stored in area 1747. The channel 4 transmission data and reception data are stored in area 1748.

Although FIG. 6 depicts four channels, there may be, for example, six channels available in accordance with the present exemplary embodiment. Each Channel's send (transmit) data and receive data byte sizes are all independently assignable by setting size parameters. In the exemplary embodiment, all channels size parameter setups are required, whether they are used or not. As shown in FIG. 6, RAM 174 is used for each channel's TxData/RxData assignment. TxData/RxData assignment becomes effective when main processor 11 sets a format flag by using a write to RAM 174 related command.

In the exemplary embodiment, if processor 11 writes "0x00", "0xFD", "0xFE" or "0XFF" as TxData Size, the data is not recognized as TxData size but has a special ftinction as indicated below. They become effective when processor II sets a format bit by using a write to RAM 174 related command.

"0x00"=Channel Skip
If 0x00 is written as TxData Size, respective controller 40 Channel transaction is not executed.

"0xFD"=Channel Reset
If 0xPD is written as TxData Size, controller control circuit 17 outputs reset signal to respective controller 40 Channel.

"0xFE"=Format End
If 0xFE is written as TxData Size, TxData RxData assignment, the TxData Size or RxData Size after "0XFE" is ignored.

"0xFF"=Dummy Data
TxData Size's 0xFF is used as the dummy data for word aligning the data area.

Each Channel has four flags. Two of them have information from processor 11 to controller 40 Channel and others from controller 40 Channel to processor 11.

Skip=Channel Skip
If processor 11 sets this flag to "1", respective controller 40 Channel transaction is not executed. This flag becomes effective without formal flag.

Res=Channel Reset
If CPU 11 set this flag to "1" controller control circuit 17 outputs reset signal to respective controller 40 Channel. This flag becomes effective without format flag.

NR=No Response to JoyChannel
When each controller 40 Channel's peripheral device does not respond, the respective NR bit is set to "1". This is the way to detect the number of currently connected peripheral devices.

Err=JoyChannel Error
When communication error has occurred between controller control circuit 17 and controller 40, Err flag is set to "1".

The data transfer control circuit 171 sends the desired command from the send circuit 172 and causes the receive circuit 173 to store received data in RAM 174. An exemplary implementation of the FIG. 4 controller control circuit 17 is described in further detail in the above identified incorporated application Ser. No. 08/562,288 (the peripheral interface or PIF therein).

The controller connectors 181–184 are connected by serial lines to the various controller control circuit 17 channel I/O lines, and are shaped so as to link with the connection jack 41 on each controller 40. When a controller connector 181–184 is connected with a controller 40 connection jack 41, it is electrically connected with the controller 40 so that data can be exchanged.

Figure 7A:
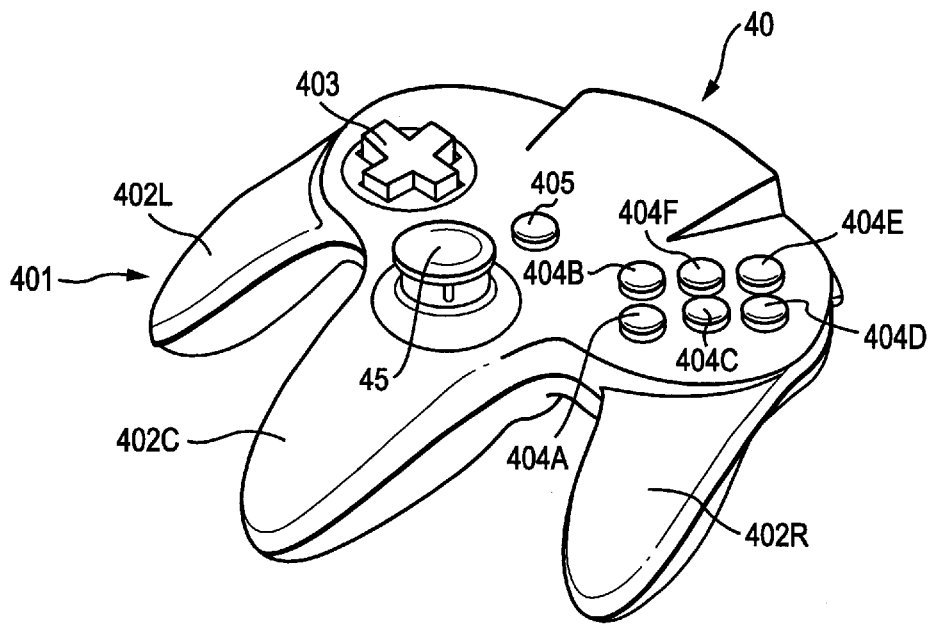
FIGS. 7A and 7B are perspective views of a controller of the FIG. 2 embodiment as viewed from top and bottom.
Figure 7B:
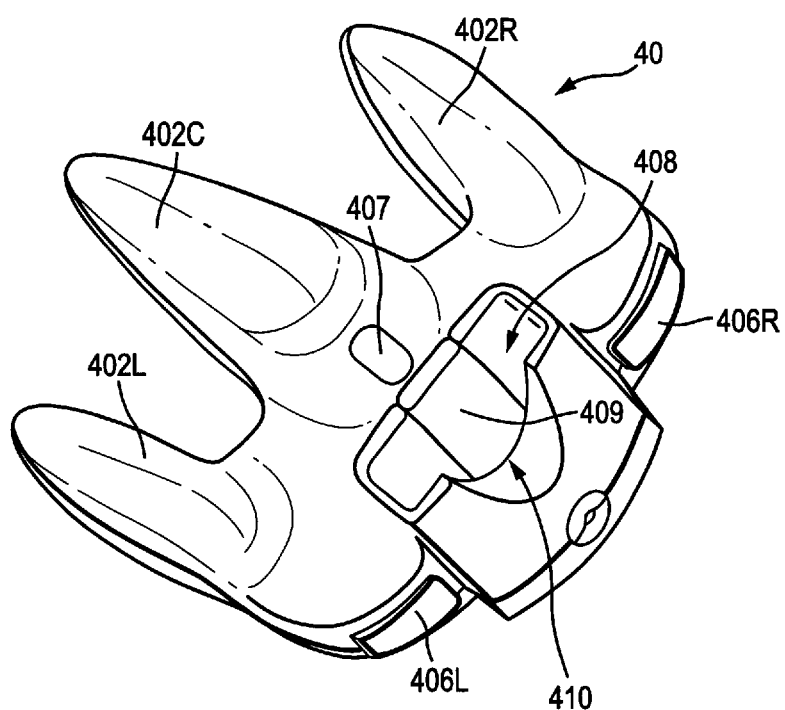

FIGS. 7A and 7B are external oblique-view drawings of a controller 40 front and back surface. The controller 40 is in a shape that can be grasped by both hands or one hand, and has a housing having an exterior with a plurality of projecting operation buttons for generating an electric signal and a vertically-standing control operation member portion. Specifically, the controller 41 is constituted by an upper housing and a lower housing. The top housing of the controller 40 comprises an operation area in which an analog joystick 45, which is used to designate displayed character direction over a 360 degree angular range, and buttons 403, 404A–F and 405 are situated adjacent 3 grips 402L, 402C and 402R. The bottom housing of the controller 40 comprises an operation area in which a button 407 is situated, 3 grips 402L, 402C and 402R and an expansion device mount shown in the vicinity of 409. In addition, buttons 406L and 406R are situated at the boundary between the top housing and bottom housing of the controller 40. Furthermore, an electrical circuit, to be described below, is mounted inside the top and bottom housings. The electrical circuit is electrically connected to the video processing device 10 by cable 42 and connection jack 41. Button 403 may, for example, be a cross switch-type directional switch consisting of an up button, down button, left button and right button, which may be used to control the displayed position of a displayed moving object, such as the well known Mario character, in at least four directions. Buttons 404 consist of button 404A, button 404B, button 404C, button 404D, button 404E and button 404F, and can be used, for example, in a video game to fire missiles to control jumping, kicking, or for a multitude of other functions depending upon the game program.

Button 405 is a start button and is used primarily when starting a desired program. As shown in FIG. 7B, button 406L is situated so that it can be easily operated by the index finger of the left hand, and button 406R is situated so that it can be easily operated by the index finger of the right hand. Button 407 is situated on the bottom housing such that it cannot be seen by the operator during normal game play.

The housing of the controller 40 has three grips 402L, 402C and 402R formed in a manner projecting downward from three locations of the operating area. The grips 402L, 402C and 402R are in such rod-shaped form that, when seized by the hand, they are contoured by the palm, the middle finger, the finger between the little finger and the middle finger and the little finger. Each grip is formed with a relatively thin base portion, a thicker intermediate portion and a thinner portion toward an open end. The lower housing of the controller 40 has an insertion aperture 408 formed at a centrally upper portion which projects from the underside for detachably attaching a RAM cartridge 50 as an expansion device which is connected to connector 46 shown in FIG. 9. In a back surface at the base portion of the central grip 402C, a switch 407 is provided as a switch having a function, which may vaiy based on the game program, or function similar to the switch 406L when the joystick 45 is used in place of the cross switch 403.

The lower half of the housing on a back surface side extends toward a bottom surface to have the aperture 408 formed at a tip thereof. At a deep end of the aperture 408, a connector (not shown) to which an extension cartridge 50 is to be connected is provided. In the aperture 408 is also formed a lever 409 for ejecting a cartridge 50 inserted in the aperture 408. On a side opposite to the lever 409 a cut-out 410 is formed, which cut-out 410 provides a space for pulling out the extension cartridge 50 upon taking out the extension cartridge 50 by using the lever 409.

Figure 8:
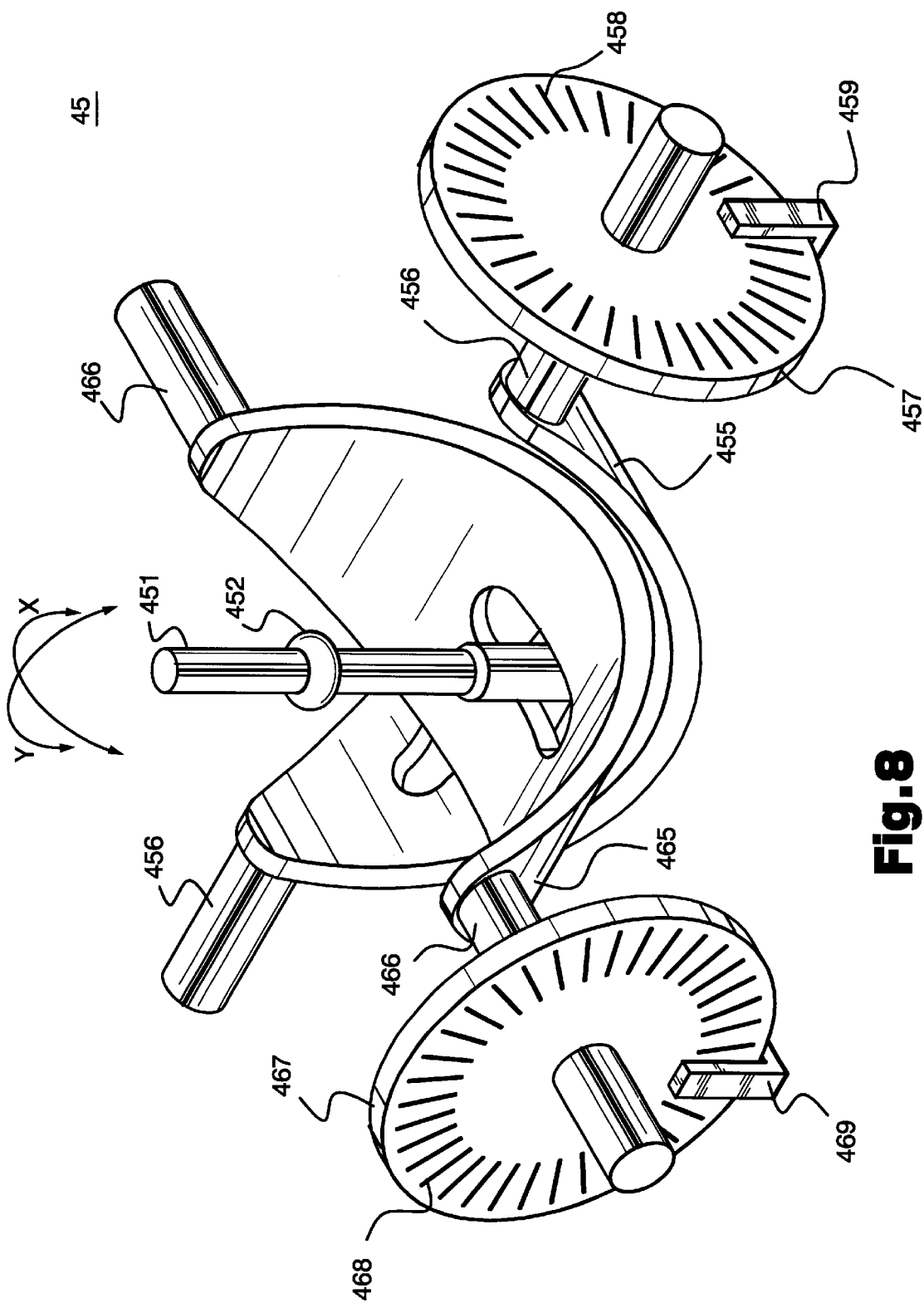
FIG. 8 is an illustrative internal structure of the joystick of the controller of the FIG. 2 embodiment.

An exemplary internal construction of the controller 40 joystick 45 is shown in FIG. 8. The tip of the operation member 451 protruding from the housing is formed into a disk which is easily manipulated by placing one's finger on it. The part below the disk of the operation member 451 is rodshaped and stands vertically when it is not being manipulated. In addition, a support point 452 is situated on the operation member 451. This support point 452 securely supports the operation member on the controller 40 housing so that it can be tilted in all directions relative to a plane. An X-axis linkage member 455 rotates centered around an X shaft 456 coupled with tilting of the operation member 451 in the X-direction. The X shaft 456 is axially supported by a bearing (not shown). A Y-axis linkage member 465 rotates centered around a Y shaft 466 coupled with tilting of the operation member 451 in the Y-direction. The Y shaft 466 is axially supported by a bearing (not shown). Additionally, force is exerted on the operation member 451 by a return member, such as a spring (not shown), so that it normally stands upright. Now, the operation member 451, support 452, X-axis linkage member 455, X shaft 456, Y-axis linkage member 465 and Y shaft 466 are also described in Japan Utility Patent Early Disclosure (Kokai) No. HEI 2-68404.

A disk member 457 is attached to the X shaft 456 which rotates according to the rotation of the X shaft 456, The disk member 457 has several slits 458 around the perimeter of its side at a constant distance from the center. These slits 458 are holes which penetrate the disk member 457 and make it possible for light to pass through. A photo-interrupter 459 is mounted to the controller 40 housing around a portion of the edge of the perimeter of the disk member 457, which photo-interrupter 459 detects the slits 458 and outputs a detection signal. This enables the rotated condition of the disk member 457 to be detected. A description of the Y shaft 466, disk member 467 and slits 468 are omifted since they are the same as the X shaft 456, disk member 457 and slits 458 described above.

The technique of detecting the rotation of the disc members 457 and 467 using light, which was described above, is disclosed in detail in Japan Patent Application Publication No. HEI 6-114683, filed by applicants' assignee in this matter, which is incorporated herein by reference.

In this exemplary implementation, disk member 457 is directly mounted on the X-axis linkage, member 455, but a gear could be attached to the X shaft 456 and the disc member 457 rotated by this gear. In such a case, it is possible to cause the disc member 457 to greatly rotate by the operator slightly tilting the operation member 451 by setting the gear ratio so that rotation of the disc member 457 is greater than rotation of the X shaft 456. This would make possible more accurate detection of the tilted condition of the operation member 451 since more of the slits 458 could be detected. For further details of the controller 40 joystick linkage elements, slit disks, optical sensors and other elements, reference is made to Japanese Application No. H7-317230 filed Nov. 10, 1995, which application is incorporated herein by reference.

Additionally, in the exemplary embodiment, a method for detecting the rotation of the disc members 457 and 467 is disclosed which detects the slits 458 and 468 using photo-interrupters 459 and 469, but any method could be used in conjunction with this exemplary embodiment as long as it detects rotation of the disc members 457 and 467. For example, a method of detecting the disk members 457 and 467 rotation could be used in which several conductor members are situated on the disc members 457 and 467 and these conductor members are then electrically detected.

Figure 9:
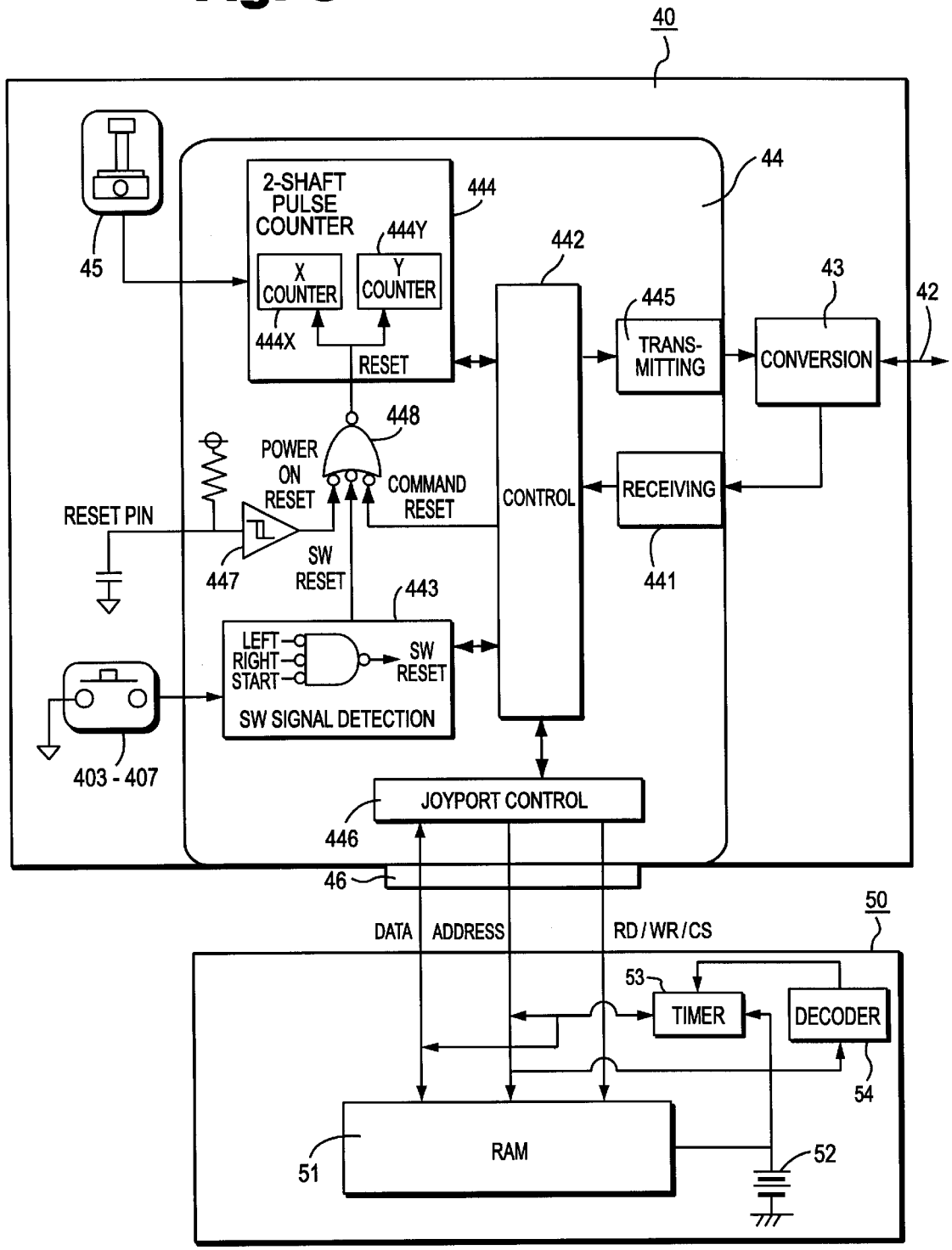
FIG. 9 is a block diagram showing in detail the controller and an expansion device.

Controller 40 which is connected to the FIG. 2 connector 181 is described in conjunction with the FIG. 9 block diagram. The controller 40 incorporates within its housing electronic circuits such as operation signal processing circuit 44, etc. in order to detect operating states of the switches 403–407 or the joystick 45 or the like and transfer detected data to the controller control circuit 17. The operation signal processing circuit 44 includes a signal receiving circuit 441, a control circuit 442, a switch signal detecting detecting circuit 443, a counter circuit 444, a signal transmitting circuit 445, a joyport control circuit 446, a reset circuit 447 and a NOR gate 448.

The remaining controllers 40 which are connected to the aforementioned controller connectors 182–184 are identical to controller 40 which is connected to controller connector 181. The FIG. 2 connection jack 41 is connected to the controller connector 181–184 so that data which has been transmitted from the video processing device 10 is output to a conversion circuit 43.

The conversion circuit 43 sends and receives data to and from the controller control circuit 17 in the video processing device 10 as a serial signal via cable 42. The conversion circuit 43 sends serial data received from the controller control circuit 17 as a serial signal to receiving circuit 441 inside the controller circuit 44. It also receives a serial signal from the transmitting or send circuit 445 inside the controller circuit 44 and then outputs this signal as a serial signal to the controller control circuit 17 via cable 42.

The send circuit 445 converts the parallel signal which is output from the control circuit 442 into a serial signal and outputs the signal to conversion circuit 43. The receive circuit 441 converts the serial signal which has been output from converter circuit 43 into a parallel signal and outputs it to control circuit 442.

The send circuit 445, receive circuit 441, joy port control circuit 446, switch signal detection circuit 443 and counter 444 are connected to the control circuit 442. The signal receiving circuit 441 converts a serial signal, such as a control signal transmitted from the controller control circuit 17, write-in data to the RAM cartridge 50, etc., into a parallel signal to supply it to the control circuit 442. A parallel signal from receive circuit 441 is input to control circuit 442, whereby it receives the data/command information which has been output from video processing device 10. The control circuit 442 performs the desired operation based on such received data. The control circuit 442 instricts the switch signal detection circuit 443 to detect switch signals, and receives data from the switch signal detection circuit 443 which indicates which of the buttons have been pressed. The control circuit 442 also instructs the counter 444 to output its data and receives data from the X counter 444X and the Y counter 444Y. The control circuit 442 is connected by an address bus and a data bus to an expansion port control circuit 446. By outputting command data to port control circuit 446, control circuit 442 is able to control expansion device 50, and is able to receive expansion device output data.

The control circuit 442 generates a reset signal to cause resetting (i.e., setting to 0) of measured values of an X-axis counter 444X and a Y-axis counter 444Y included in the counter 444, when the control signal transmitted from the controller control circuit 17 is a reset signal for an X, Y coordinate of the joystick 45. The joystick 45 includes photo-interrupters for the X-axis and Y-axis so as to generate a number of pulses proportional to the amount of inclination of a lever in directions of the X-axis and Y-axis, providing respective pulse signals to the counters 444X and 444Y. The counter 444X, when the joystick 45 is inclined in the X-axis direction, measures the number of pulses generated in proportion to the amount of inclination. The counter 444Y measures the number of pulses generated in proportion to the amount of inclination, when the joystick 45 is inclined in the Y-axis direction. Accordingly, the resultant vector, determined by the measured values in the X-axis and Y-axis of the counter 444X and the 444Y, determines the direction of movement and the coordinate position of the displayed player controlled heroic character or the cursor. Incidentally, the counter 444X and the counter 444Y are also reset of their measured values by a reset signal supplied from the reset signal generating circuit 447 upon turning on the power supply, or a reset signal supplied from the switch signal detecting circuit 443 when a player simultaneously depresses two switches. The switch signal detecting circuit 443 responds to an output command signal representing a switch state supplied at a constant period (e.g., at a 1/30-second interval as a frame period of a television), and reads a signal that is varied by the state of depression of the cross switch 403 and the switches 404A–404F, 405, 406L, 406R and 407 to supply it to the control circuit 442.

The control circuit 442 responds to a read-out command signal of operating state data from the controller control circuit 17, and supplies the operating state data of the switches 403–407 and the measured values of the counters 444X, 444Y to the signal transmitting circuit 445 in a predetermined data format order. The signal transmitting circuit 445 converts these parallel signals output from the control circuit 442 into serial data to transfer them to the controller control circuit 17 via a conversion circuit 43 and a signal line 42.

The control circuit 442 is connected to an address bus, a data bus, and a port control circuit 446 through a port connector 46. The port control circuit 446 performs input-output control (or signal transmission or reception control) on data according to commands from the CPU 11, when the RAM cartridge 50 as one example of an expansion device is connected to a port connector 46. The RAM cartridge 50 includes a RAM 51 and a timer chip 53 as one example of a time-related information generating means (or a calendar timer) connected to the address bus and the data bus, a battery 52 connected thereto for supplying power to the RAM 51 and the time counter 53, and a decoder 54 for activating the timer counter 53 when a predetermined address is given. The RAM 51 is a RAM that has a capacity lower than a half of its maximum memory capacity accessible by using the address bus, and may be comprised, for example, of a 256 k-bit RAM. The lower capacity is used to avoid duplication between the write-in/read-out address of the RAM and the read-out address of the timer chip 53 by reading out a value of an arbitrary counter within the timer chip 53 when the highest order bit becomes "1". The RAM 51 stores backup data associated with a game, so that if the RAM cartridge 50 is removed out of the port connector 46, the stored data is maintained by receiving power supply from the battery 52 The details of the kind of data stored by the RAM 51, writing data therein, and utilization of the data stored is described below.

Figures 10, 15:
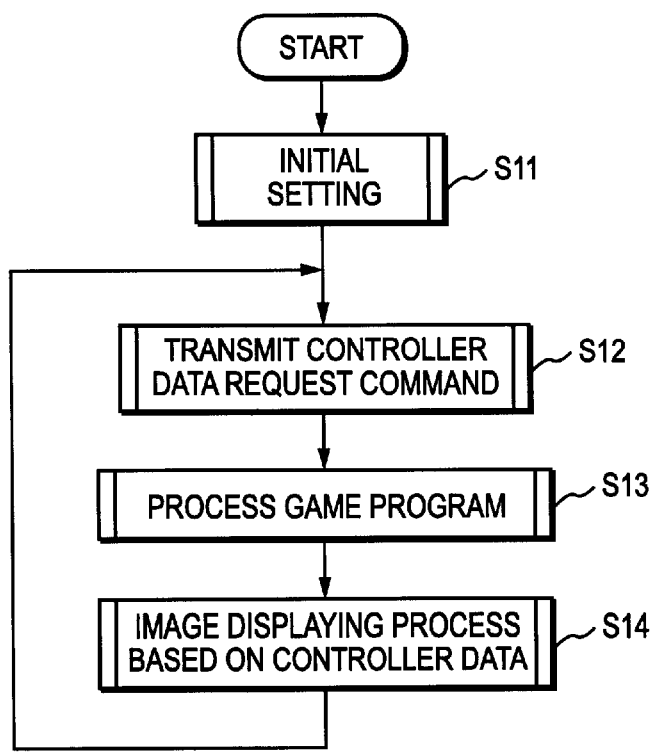
FIG. 10 shows illustrative data from a controller's analog joystick and respective keys/buttons.
FIG. 15 is a flowchart showing illustrative operation of the CPU of the FIG. 2 embodiment.

FIG. 10 is a graphical illustration of a data format by which the image processing apparatus reads out data representative of the operating state of switches 403–407 and joystick 45 from the controller 40. The data generated by the controller 40 is configured as 4-byte data. The first-byte B, A, G START, upper, lower, left and right, i.e., represents the state of switch 404B, 404A, 407, 405 and the four cross switch 403 directions. Similarly, the second-byte JSRST, O (which presently is optional in the exemplary embodiment), L, R, E, D, C and F. represents the state of switch 409, 406L, 406R, 404E, 404D, 404C and 404F. The third byte represents by binary digits the X coordinate value (the value measured by the X counter 444X) which value depends upon that inclination angle of the joystick 45 in the X direction. The fourth byte represents by binary digits the Y coordinate value (the value measured by the Y counter 444Y) which value depends upon the inclination angle of the joystick 45 in the Y direction. Because the X and Y coordinate values are expressed by 8 bits of binary digits, the conversion into decimal digits makes it possible to represent the inclination of the joystick 45 by a numeral from 1–225. If the highest order bit is expressed by a value denoting a negative value, the inclination angle of the joystick 45 can be expressed by a numeral between –128 and 127.

Turning back to FIG. 9, the expansion port control circuit 446 is connected to the control circuit 442 and via an address, control and data bus to expansion device 50 via a port connector 46. Thus, by connecting the control circuit 442 and expansion device 50 via an address bus and a data bus, it is possible to control the expansion device 50 according to commands from the main CPU 11 in the video processing device 10.

The exemplary expansion device 50, shown in FIG. 9, is a back-up memory card 50. Memory card 50 may, for example, include a RAM device 51 on which data can be written to and read from desired indicated addresses appearing on an address bus and a battery 52 which supplies the back-up power necessary to store data in the RAM device 51. By connecting this back-up memory card 50 to expansion (joy port) connector 46 in the controller 40, it becomes possible to send data to and from RAM 51 since it is electrically connected with the joy port control circuit 446.

The memory card 51 and game controller connector 46 provide the game controller and the overall video game system with enhanced flexibility and function expandability. For example, the game controller, with its memory card, may be transported to another player's video game system console. The memory card may store and thereby save data relating to individual achievement by a player and individual, statistical information may be maintained during game play in light of such data. For example, if two players are playing a racing game, each player may store his or her own best lap times. The game program may be designed to cause video processing device 10 to compile such best lap time information and generate displays indicating both statistics as to performance versus the other player and a comparison with the best prior lap time stored on the memory card. Such individualized statistics may be utilized in any competitive game where a player plays against the video game system computer and/or against opponents. For example, with the memory card, it is contemplated that in conjunction with various games, individual statistics relating to a professional team will be stored and utilized when playing an opponent who has stored statistics based on another professional team such as a baseball or football team. Thus, RAM 51 may be utilized for a wide range of applications including saving personalized game play data, or storing customized statistical data, e.g., of a particular professional or college team, used during game play.

Referring to FIGS. 11 to 14 an explanation follows of a format for the signals transmitted and received between the image processing apparatus 10 and the controller 40.

Figure 11:
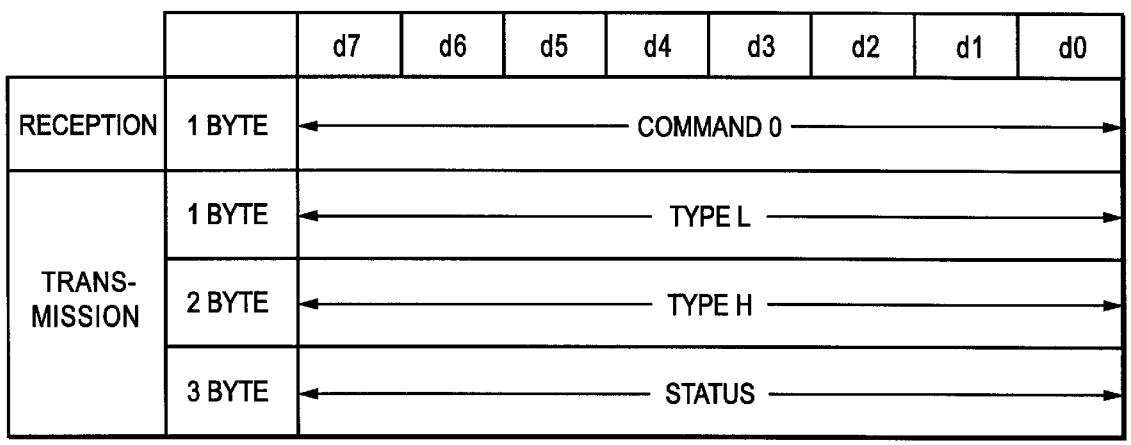
FIG. 11 shows illustrative transmission and reception data when a command "0" is transmitted from the controller control circuit.

FIG. 11 is an illustrative representation of a format for the signals transmitted and received between the image processing apparatus 10 and the controller 40 for identification of a controller 40 type by the image processing apparatus 10. The image processing apparatus 10 transmits, to a control circuit 442 within the controller 40, a type data request signal of a command "0" configured by 1 byte (8 bits) to the control circuit 442 within the controller 40, and receives in response thereto 3 bytes of a type data signal, concerning the controller 40, of TYPE L and TYPE H which are data inherent as to a type of a RAM cartridge 50. Based on the data, the image processing apparatus 10 identifies the type of a controller 40, i.e., 50 the type of a RAM cartridge 50 which is connected to the controller 40. The type of RAM cartridge 50 may, for example, indicate a type merely mounted only with a RAM 51, a type mounted with a RAM 51 together with a timer chip, and a type mounted with a RAM 51 together with a liquid crystal display. In the present embodiment, the type mounted with a RAM 51 and a timer chip is explained in detail. Additionally, status data is included that represents whether or not the port is connected to an extension device such as a RAM cartridge 50 and whether or not an extension device is connected thereto after resetting.

Figure 12:
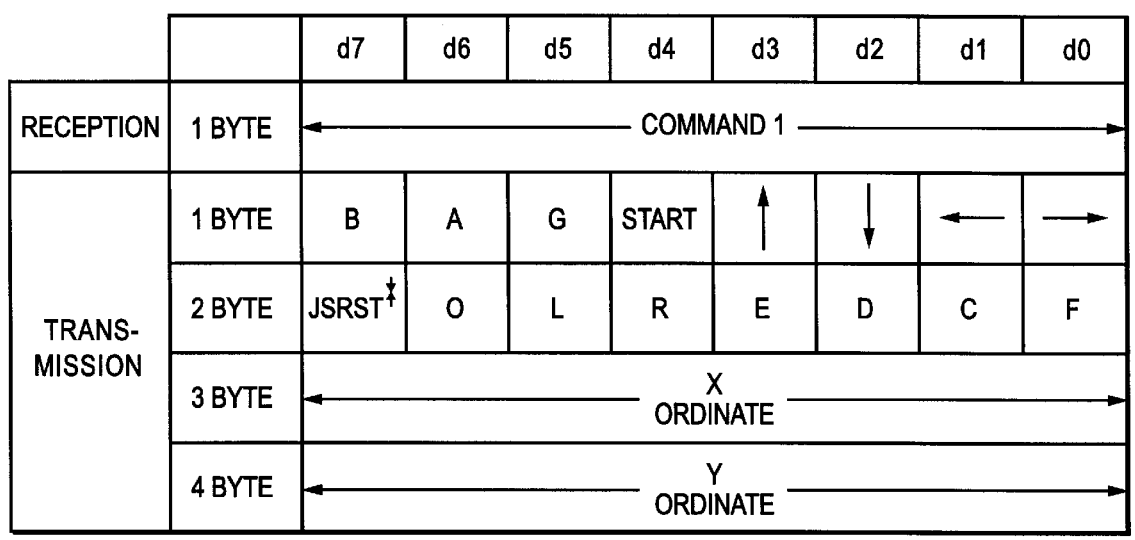
FIG. 12 shows illustrative transmission and reception data when a command "1" is transmitted from the controller control circuit.

FIG. 12 is an illustrative representation of a format for the signal transmitted and received between the image processing apparatus 10 and the controller 40 for determining the operating state of the controller 40 by the image processing apparatus 10. The image processing apparatus 10 transmits, to the control circuit 442 within the the controller 40, a controller data request signal of a command "1" configured by 1 byte (8 bits) to the control circuit 442 within the controller 40, and receives in response thereto an operating state data signal concerning the controller 40, generated by the control circuit 442. Based on the operating state data, the image processing apparatus 10 determines how the operator operates the controller 40 for utilization for varying the image. The operating state data signal has been described in detail above in the explanation on FIG. 10.

Figure 13:
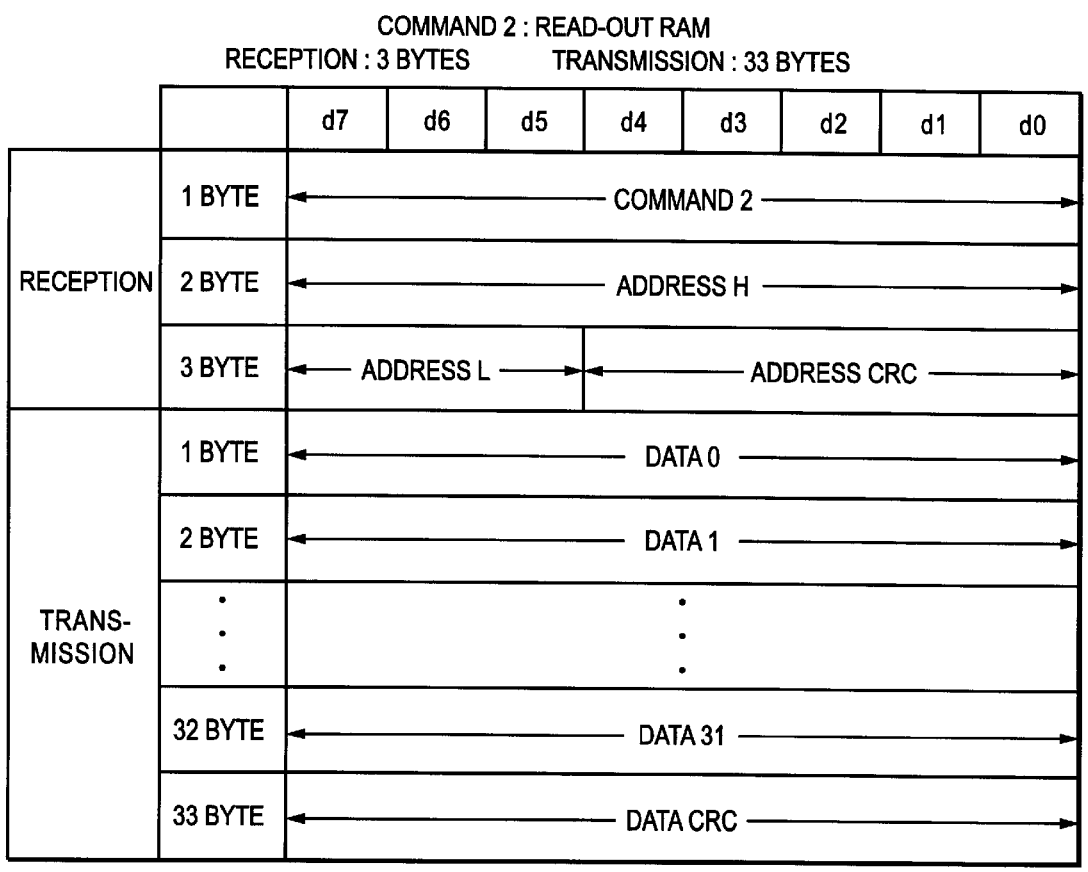
FIG. 13 shows illustrative transmission and reception data when a command "2" is transmitted from the controller control circuit.

FIG. 13 is an illustrative representation of a format for a read data command signal when the image processing apparatus 10 reads data out from RAM 51 within the RAM cartridge 50 which is connected to controller 40. The image processing apparatus 10 transmits to control circuit 442, a read command signal of a command "2" format configured by 1 byte (8 bits), an address H (8 bits) signal representative of the higher order bits of an address, an address L (8 bits) signal representative of the lower order bits of an address and an address CRC (5 bits) signal for checking for transmission errors of address data of the address H signal and address L signal. The image processing apparatus receives in response thereto a storage data signal, for the RAM 51, generated by the control circuit 442 and a data CRC (8 bits) signal for checking for data transmissions error. Incidentally, to read out time-related information of the time chip 53 by the image processing apparatus 10, it is satisfactory to read out addresses of 8000h or higher by merely rendering the address H signal value greater than 90h.

FIG. 14 is an illustrative representation of a format for a write data command signal when the image processing apparatus 10 writes data into the RAM 51 within the RAM cartridge 50 connected to controller 40. The image processing apparatus 10 transmits to the control circuit 442, a write command signal of a command "3" format configured by 1 byte (8 bits), an address H (8 bits) signal representative of higher order bits of an address, an address L signal representative of lower order bits (3 bits) of an address, an address CRC (5 bits) signal for checking for transmission error of address data of the address L signal, and a 32-byte write-in data signal to be written into the RAM 51. The image processing apparatus 10 receives in response thereto a data CRC (8 bits) signal generated by the control circuit 442 for checking for data reception error. The image processing apparatus 10 receives the CRC signal to perform CRC checking with the transmitted write-in data, and judges based thereon that the data has correctly been written into the RAM 51. Incidentally, to reset for example date and time by writing time-related information into the time chip from the image processing apparatus 10, it is satisfactory to perform writing into addresses of 8000H or higher by merely rendering the address H signal value greater than 80h.

The operation of data transmission and reception between the image processing apparatus 10 and the controller 40 will now be explained.

Referring first to a flowchart for the CPU of the image processing apparatus 10 in FIG. 15, an image processing explanation is first made. At a step S11, CPU 11 is initialized based on an initial value (not shown) stored in the program data area 202 in FIG. 3. Then, at step S12, the CPU 11 outputs a control pad data request command stored in the program data area 202 to the bus control circuit 12. At a step S13, the CPU 11 carries out the desired image processing based on the program stored in the program data area 202 and the image data area 201. While the CPU 11 is executing step S13, the bus control circuit 12 is executing steps S21–S24 of FIG. 16. Then at step S14, the CPU 11 outputs image data based on the control pad data stored in the control pad data area 141 in FIG. 3. After completing step S14, CPU branches to step S12 and repeats the execution of steps S12–S14.

Figure 16:
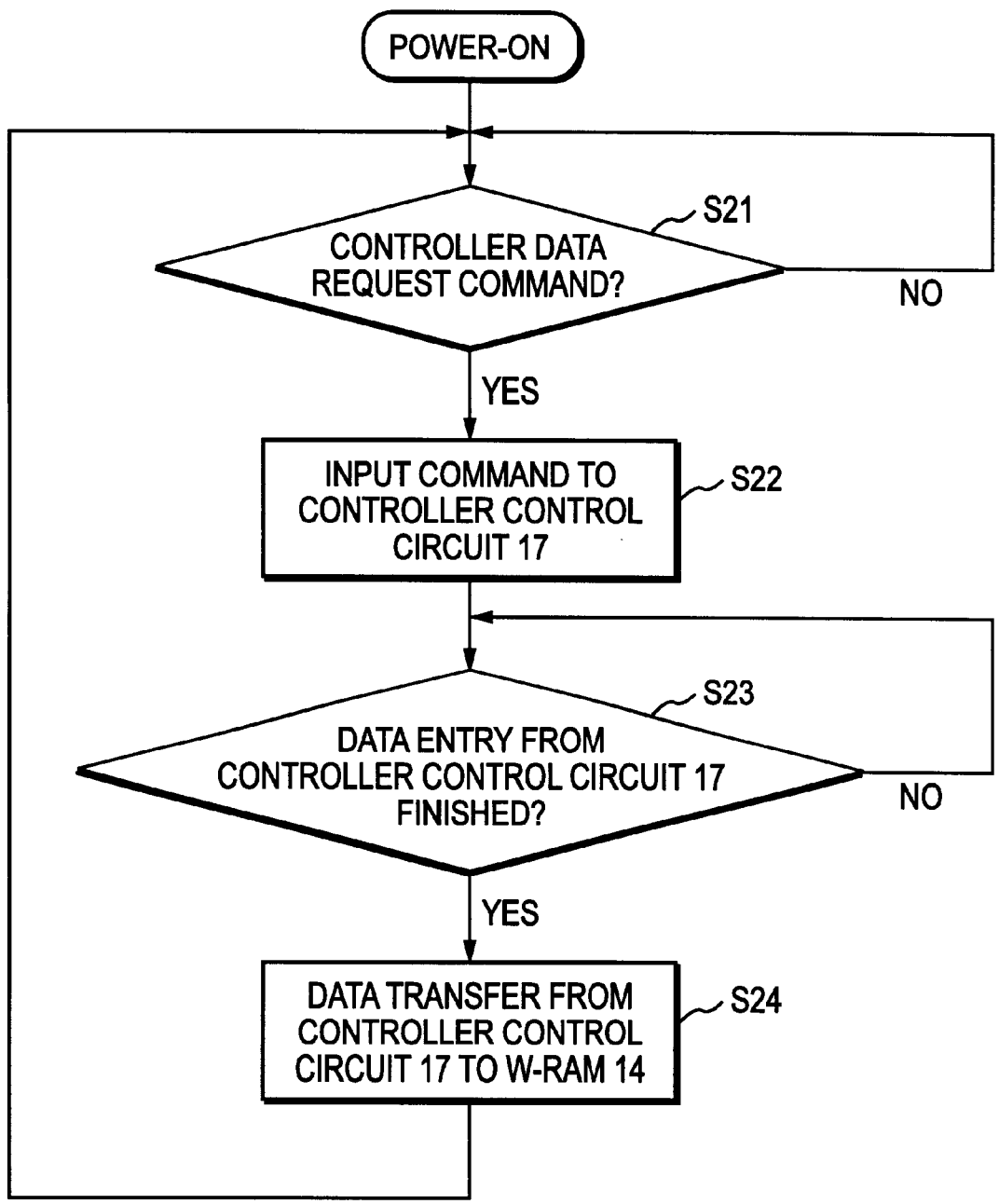
FIG. 16 is a flowchart showing illustrative operation of the bus control circuit of the FIG. 2 embodiment.

The operation of the bus control circuit 12 is explained in conjunction with FIG. 16. At a step S21, the bus control circuit 12 determines whether or not the CPU 11 has output a controller data request command (a request command for data relating to the switches of the controller 40 or data on the expansion device 50). If a controller data request command has not been output, the processing circuit 12 waits until one is output. If a controller data request command has been output, the process proceeds to a step S22. At step S22, the bus control circuit 21 outputs a command for reading in data of the controller 40 (command 1 or command 2 referred to above) to the controller control circuit 17. Then, at a step S23, the bus control circuit 12 determines whether or not the controller control circuit 17 has received data from the controller 40 to store it in the RAM 174. If the controller control circuit 17 has not received data from the controller 40 to store in the RAM 174, the bus control circuit 12 waits at step S23. If the controller control circuit 17 has received data from the controller 40 to store in the RAM 174, the process proceeds to a step S24. At step S24, the bus control circuit 12 transfers the data of the controller 40 stored in the RAM 174 to the W-RAM 14. The bus control circuit 12, when completing the data transfer to the W-RAM 14. The bus control circuit 12, when completing the data transfer to the W-RAM 14, returns the bus control circuit 12, when completing the data transfer to the W-RAM 14, returns the process back to the step S21 to repeat execution of the step S21-the step S24.

The FIG. 15 and FIG. 16 flowcharts show the example wherein, after the bus control circuit 12 has transferred data from the RAM 174 to the W-RAM 14, the CPU 11 processes the data stored in the W-RAM 14. However, the CPU 11 may directly process the data in the RAM 174 through the bus control circuit 12.

Figure 17:
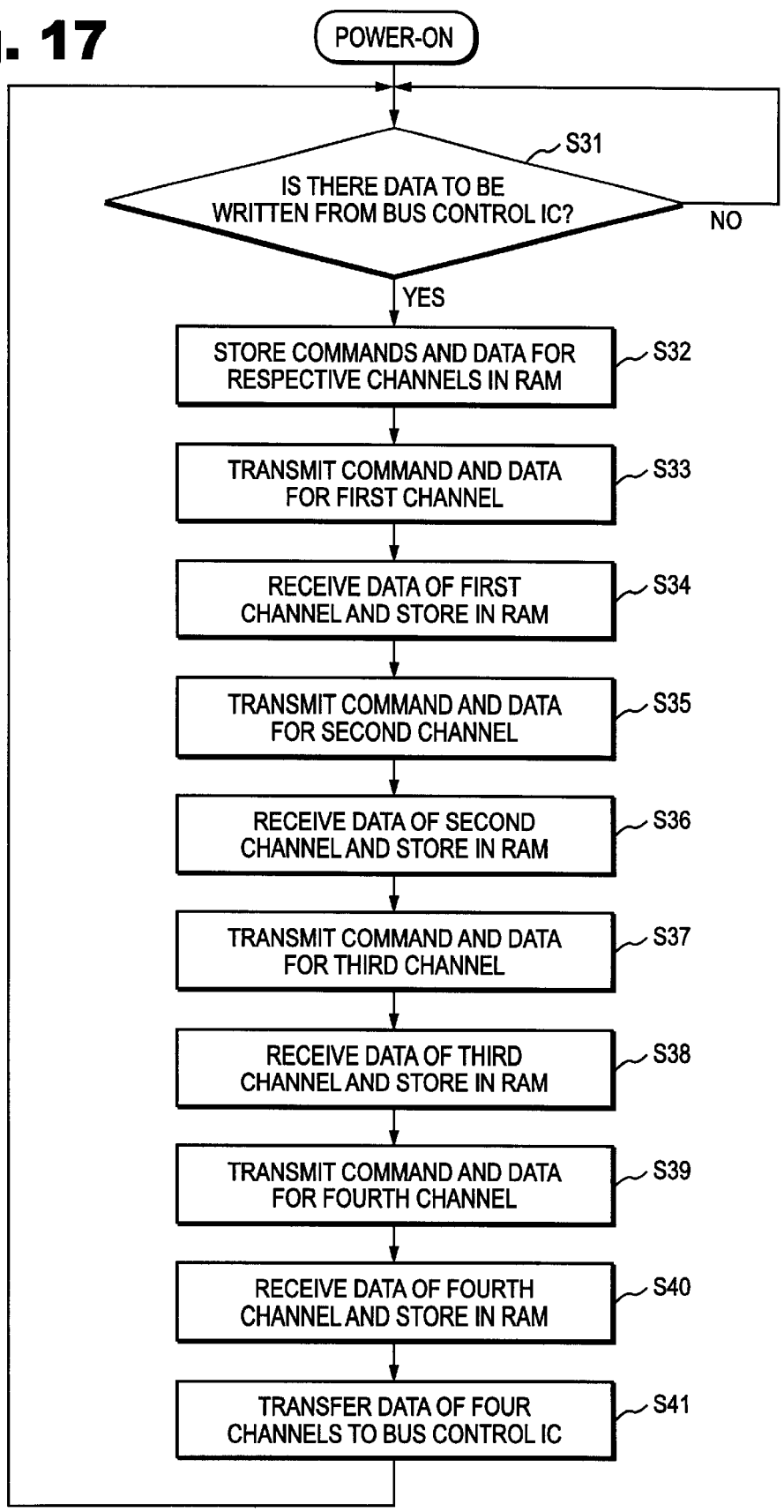
FIG. 17 is a flowchart showing illustrative operation of the controller control circuit of the FIG. 2 embodiment.

FIG. 17 is a flowchart for explaining the operation of the controller control circuit 17. At a step S31, it is determined whether there is a write wait from the bus control circuit 12. If there is not a write wait, the data transfer control circuit 171 waits until there is a write wait from the bus control circuit 12. If there is a write wait at a next step S32, the data transfer control circuit 171 causes the RAM 174 to store commands for the first to the fourth channels and/or data (hereinafter abbreviated as "command/data"). At a step S33, the command/data for the first channel is transmitted to the controller 40 being connected to the connector 181. The control circuit 442 performs a predetermined operation based on the command/data to output data to be transmitted to the image processing apparatus 10. The content of the data is described below in explaining the operation of the control circuit 442. At a step S34, the data transfer control circuit receives data output from the control circuit 442, to cause the RAM to store the data.

At a step S35 the command/data for the second channel is transmitted to the controller 40, in a manner similar to the operation for the first channel at step S33. The control circuit 442 performs a predetermined operation based on this command/data to output the data to be transmitted to the image processing apparatus 10. At a step S36 data transfer and write-in processes are carried out for the second channel. Meanwhile, at a step S37, the command/data for the third channel is transmitted to the controller 40. The control circuit 442 performs a predetermined operation based on this command/data to output the data to be transmitted to the image processing apparatus 10. At a step S38 data transfer and write-in processes are carried out or the third channel. Furtlermore, at a step S39, the command/data for the fourth channel is transmitted to the controller 40. The control circuit 442 performs a predetermined operation based on this command/data to output the data to be transmitted to the image processing apparatus 10. At a step S40, data transfer and write-in processes are carried out for the fourth channel. At a subsequent step S41, the data transfer circuit 171 transfers in batch the data which have received at the steps S34, S36, S38 and S40 to the bus control circuit 12.

In the above identified manner, the data for the first channel to the fourth channel, that is, the commands for the controllers 40 connected to the connectors 181–184 and the operating state data to be read out of the controllers 40, are transferred by time-divisional processing between the data transfer control circuit 171 and the control circuit 442 respectively within the controllers 40.

Figure 18:
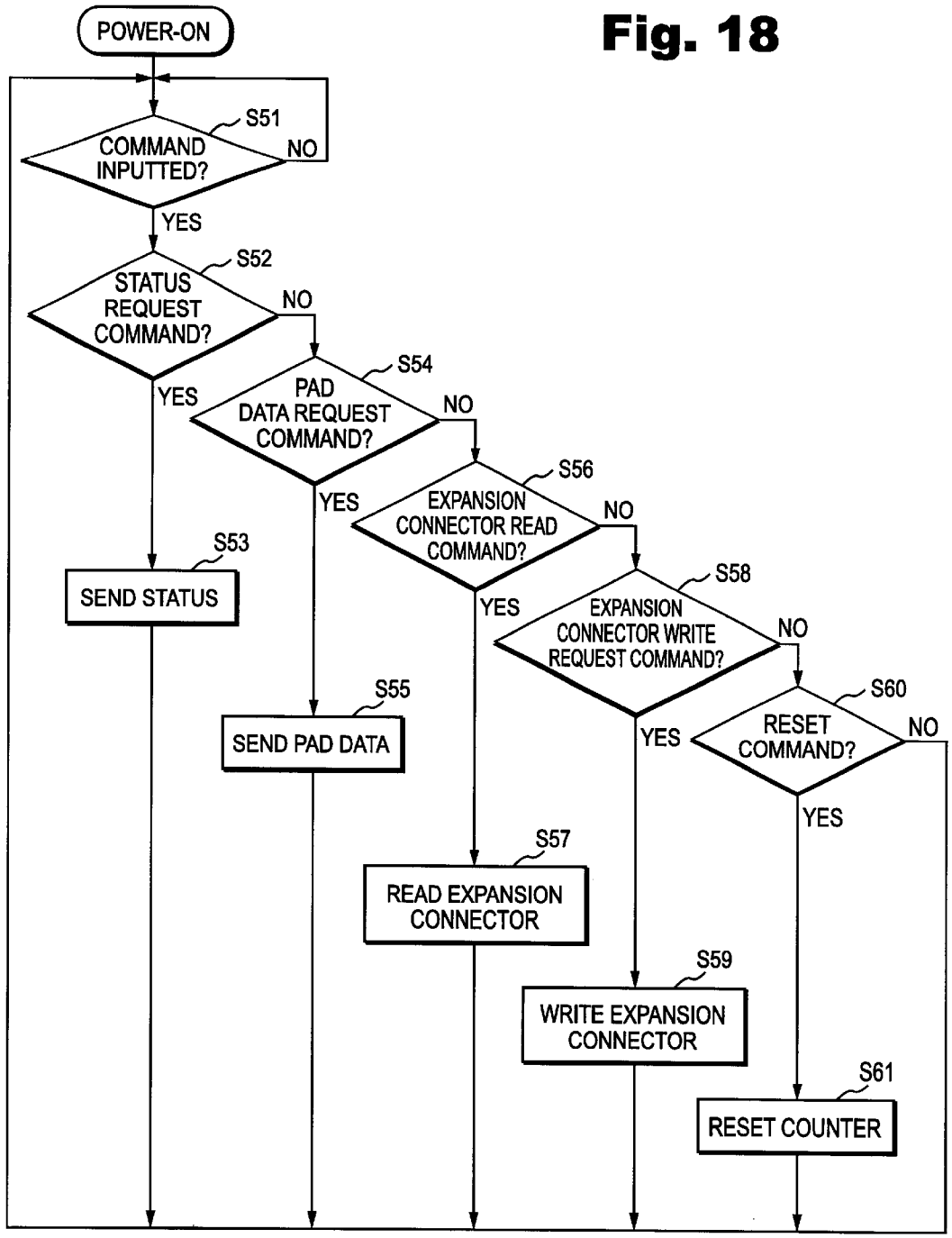
FIG. 18 is a flowchart showing illustrative operation of the controller circuit of the FIG. 2 embodiment.

FIG. 18 is a flowchart explaining the operation of the controller circuit 44. First, at a step S51, it is determined whether or not a command has been input from the image processing circuit 10 to the control circuit 442. If no command has been inputted, the controller circuit waits for a command. If a command is input, at a step S52, it ig determined whether or not the command inputted to the control circuit 442 is a status request command (command "0"). If a command "0" is detected, the process proceeds to a step S53, wherein a status transmitting process carried out.

At the step S53, where the CPU 11 outputs a command "0", the data in the format as shown in FIG. 13 is transmitted and received between the image processing apparatus 10 and the controller 40. On this occasion, the control circuit, when receiving the command "0" data configured by 1 byte (8 bits), transmits TYPE L (1 byte), TYPE H (1 byte) and the status. Here, TYPE L and TYPE H are data for identifying the function of a device or apparatus being connected to the joyport connector 46, which are inherently recorded in the RAM cartridge 50. This makes possible recognition by the image processing apparatus 10 as to what expansion device (e.g., a RAM cartridge 50 or other extension devices such as a liquid crystal display) is connected to the controller 40. The status is data representative of whether or not an extension device such as a RAM cartridge 50 is connected to the port and whether or not the connection of the expansion device is after resetting.

On the other hand, at the step S52 if the determination reveals that there is not command "0", it is determined at a step S54 whether or not the input command is a pad-data request command (command "1"). If it is a command "1", the process proceeds to a step S55 where the process of transmitting pad data is performed. Specifically, where the CPU 11 outputs a command "1", the data in format as shown in FIG. 14 is transmitted and received between the image processing 20 apparatus 10 and the controller 40. On this occasion, the control circuit 442, if receiving command "1", data configured by 1 byte (8 bits), transmits the data of 14 switches (16 bits) of B, A, G, START, upper, lower, left, right, L, R, E, D, C and F; the data of JSRST (1 bit); and the data of the counter 444X and the counter 444Y (16 bits). By transmitting such data to the image processing apparatus 10, the image processing apparatus 10 recognizes how the operator operated the controller 40. Thus, such data are utilized for modifying the image by the image processing apparatus 10 in accordance with the operating state of the controller 40, as manipulated by the player.

At the aforesaid step S54, if the determination reveals that there is not a command "1", it is determined at a step S56 whether or not the input command is a read-out request command (command "2") for data associated with the RAM cartridge 50 to be connected to the expansion connector. If it is a command "2", the process proceeds to a step S57 where the process of reading out of the extension connector. Specifically, where the CPU 11 outputs a command "2", the data in format as shown in FIG. 13 is transmitted and received between the image processing apparatus 10 and the controller 40. On this occasion, when the control circuit 442 receives command "2" data configured by 1 byte (8 bits), address H representative of the higher-order bits (3 bits) of address, address L representative of the lower-order bits (3 bits) of address, and address CRC for checking for errors in address data transmitted and received, the control circuit 442 transmits data stored in the RAM cartridge (32 bytes) and CRC (8 bits) for checking for data errors. In this manner, the connection of the RAM cartridge 50 (or other extension devices) and the image processing apparatus 10 enables the image processing apparatus 10 to process data from the RAM cartridge 50, etc.

At the aforesaid step S56, if the determination reveals that the command is not a command "2", it is determined at a subsequent step S58 whether or not the input command is a write in request command (command "3") for information associated with the RAM cartridge 50 being connected to the extension connector 46. Where it is the command "3", the process of writing data is carried out at a step 59 for the RAM cartridge 50 being connected to the extension connector 46. Specifically, if the CPU 11 outputs a command "3", the data shown in FIG. 14 is transmitted and received, in response to the command "3" between the image processing apparatus 10 and the controller 40.

That is, when the control circuit 442 receives command "3"data configured by 1 byte (8 bits), address H representative of the higher-order bits of address (8 bits), address L representative of the lower-order bits of address (3 bits), address CRC for checking for error in address data transmitted and received (5 bits), and data to be transmitted to the RAM cartridge 50 (32 bytes), it transmits CRC for checking for error for data received (8 bits). In this manner, the connection of the extension device 50 and the image processing 10 enables the image processing apparatus 10 to control the extension device 50. The connection of the extension device 50 and the image processing apparatus also drastically improves the function of the controller 40.

Figure 19:
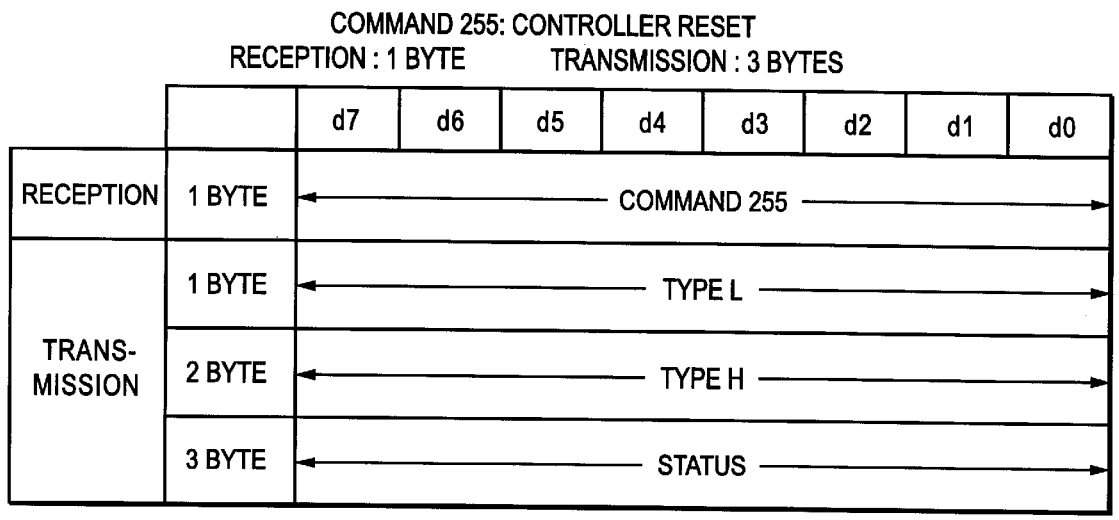
FIG. 19 shows illustrative transmission and reception data when a reset command "255" is transmitted from the controller control circuit.

If at the aforesaid step S58 the determination reveals that the command is not a command "3", it is detennined at a step 60 whether or not it is a reset command (command 255). Where it is the reset command (255), the process of resetting the counter 444 for the joystick 45 is performed at a step S61.

Where the game processing system outputs a reset command (command 255), the data shown in FIG. 19 is transmitted and received between the image processing apparatus and the controller 56. That is, the control circuit of the controller 40, if receiving command 255 data configured by 1 byte (8 bits), outputs a reset signal to reset the X counter 444X and the counter 444Y, and transmits aforesaid TYPE L (1 byte), TYPE H (1 byte) and the status.

For further details concerning the exchange of data and commands between the controllers 40 and the image processing system 10, reference is made to the incorporated by reference '288 and '019 applications.

Figure 20:
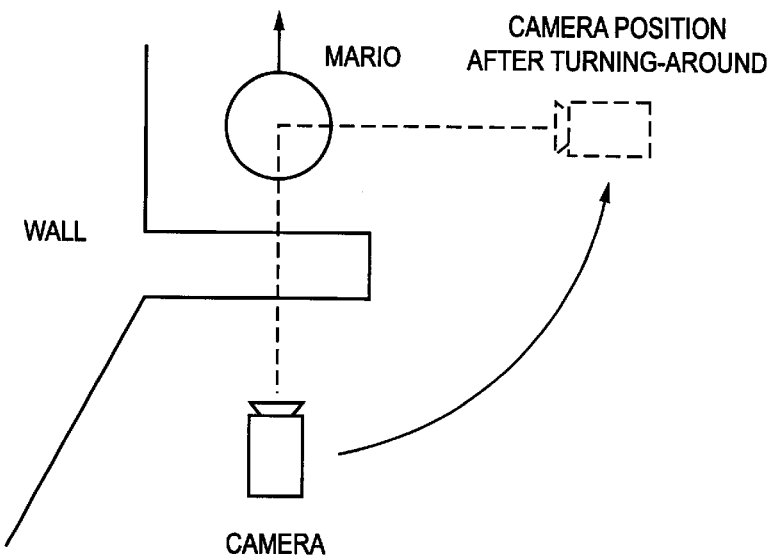
FIG. 20 is an illustrative view showing a state when a wall exists between the operable object (Mario) and the camera.

An explanation is now made concerning the various camera perspective (point of view) in three-dimensional space features of the present exemplary embodiments. That is, typically in the conventional 3D game, when an object (e.g., a wall or an enemy character) exists between a camera and a player controlled object (e.g., Mario) as shown in FIG. 20, the player-controlled object (or Mario) cannot be viewed or "photographed" by the camera. In contrast, it is possible in accordance with the present invention to continuously display Mario at all times by, in effect, turning the camera around Mario up to a lateral side thereof as shown in FIG. 20.

Figure 21:
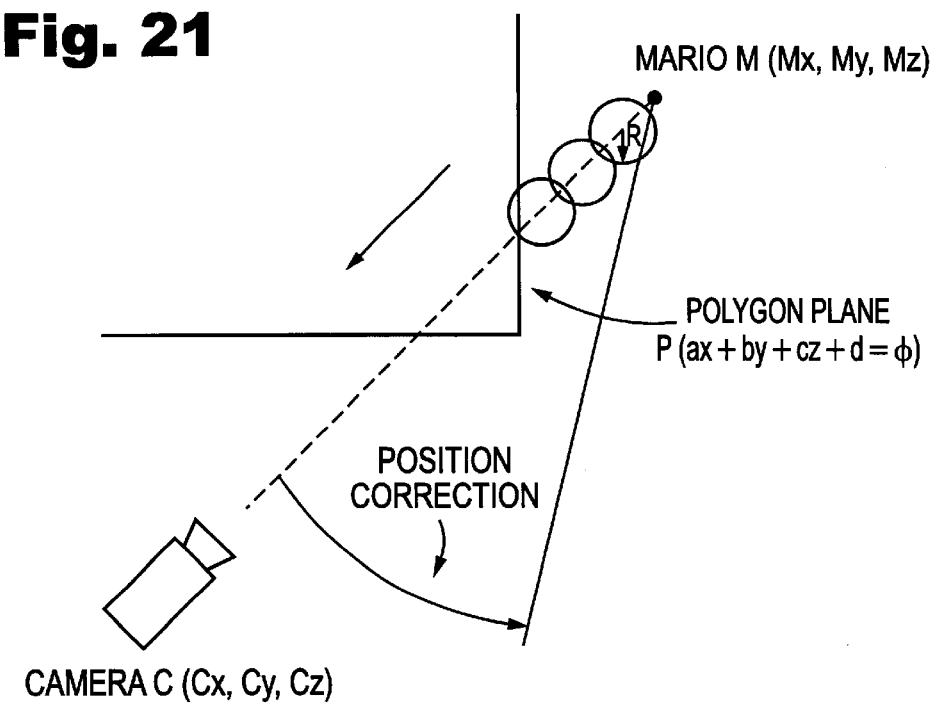
FIG. 21 is an illustrative view showing point of view movement.

Stated briefly, where the objects are situated as shown in FIG. 21, a determination is made of a potential collision with a topographical polygon extending from Mario's side, at several points on a straight line between Mario and the camera. On this occasion, checking is made for a polygon that is perpendicular to an XZ plane inside a radius R from each point. The process of turning-around of the camera is performed on a polygon P determined as collisional. The wall surface P is expressed by the flat-plane equation as given by Equation (1).

$$Ax+By+Cz+D=0 \tag{1}$$

The correction in "camera" position is done by moving the "camera" in parallel with this plane P. Incidentally, the angle of the Y-axis in parallel with the plane is calculated by the same flat-plane equation.

Figure 22:
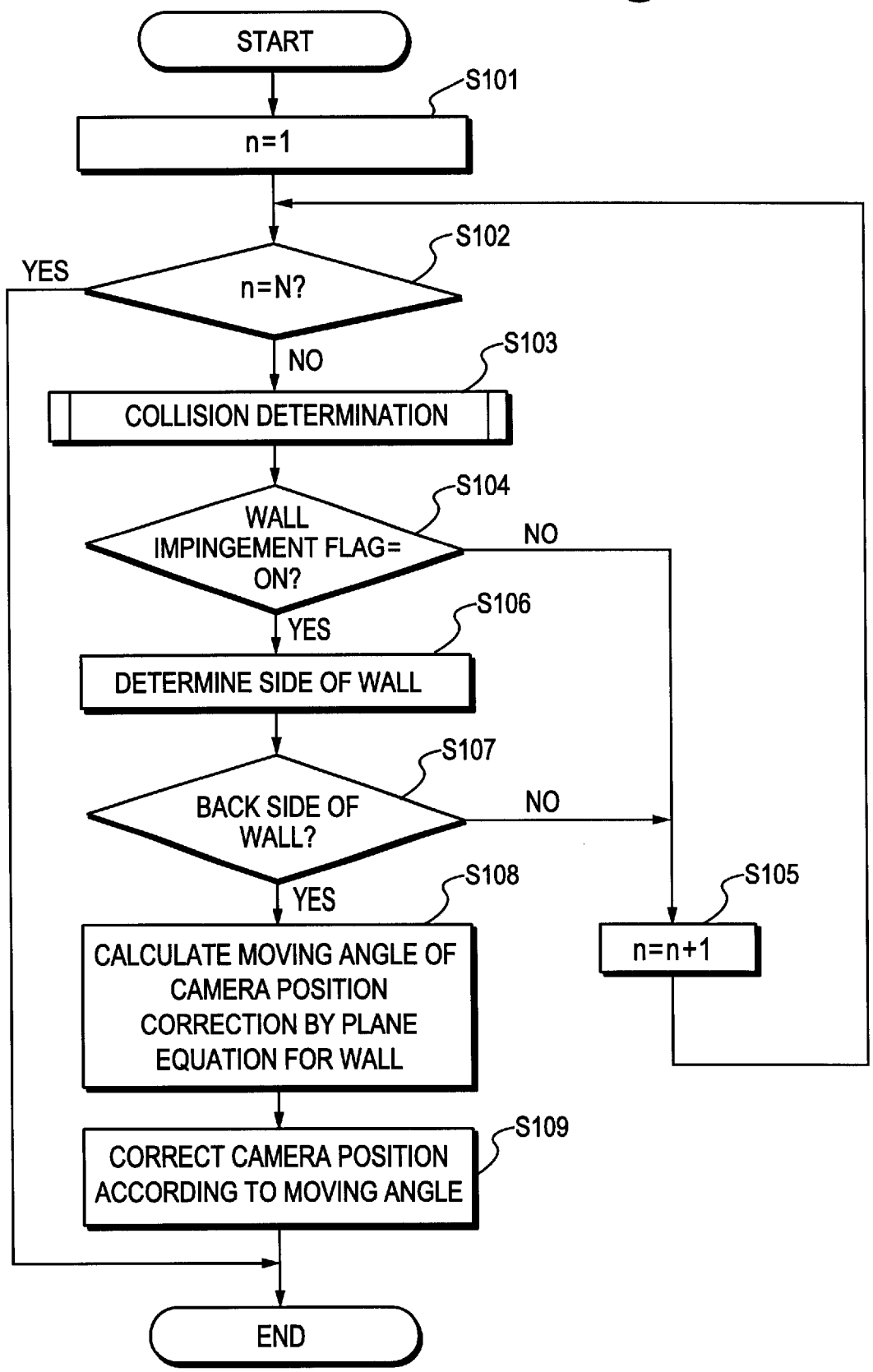
FIG. 22 is a flowchart showing operation for a camera tunming-around process.

Explaining in further detail, in conjunction with the flowchart of FIG. 22, the No. n of a polygon to be collision-detennined is initialized (n=1) at a first step S101. At a next step S102, it is determined whether or not the number N of polygons desired to be checked and the polygon No. n are equal, that is, whether or not collision-determination has been made for all necessary polygons. If the check at step S102 indicates that more polygons need to be checked then a collision-determination is made at step S103.

Figure 24:
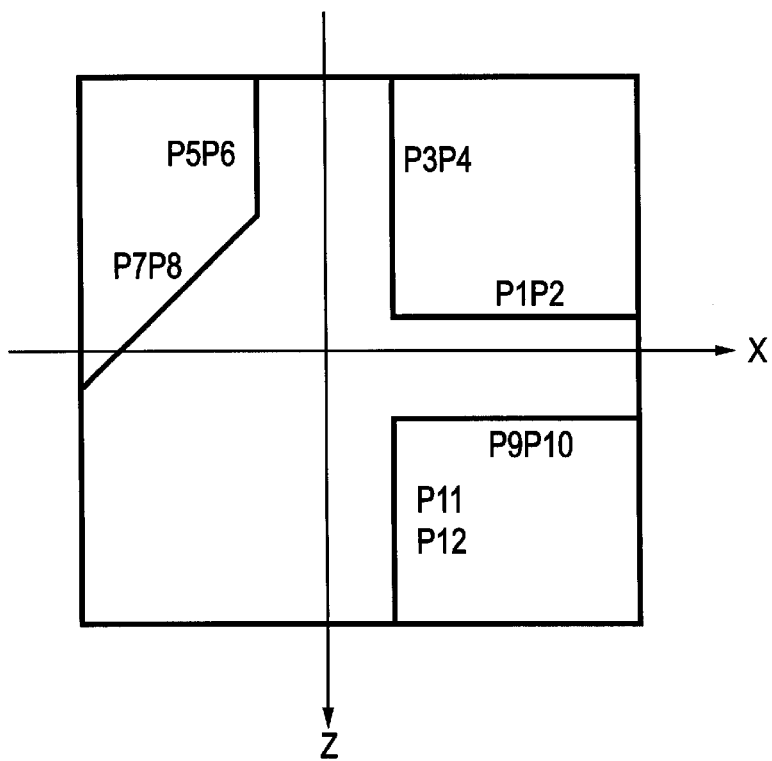
FIG. 24 is an illustrative view showing a wall polygon.
Figure 23:
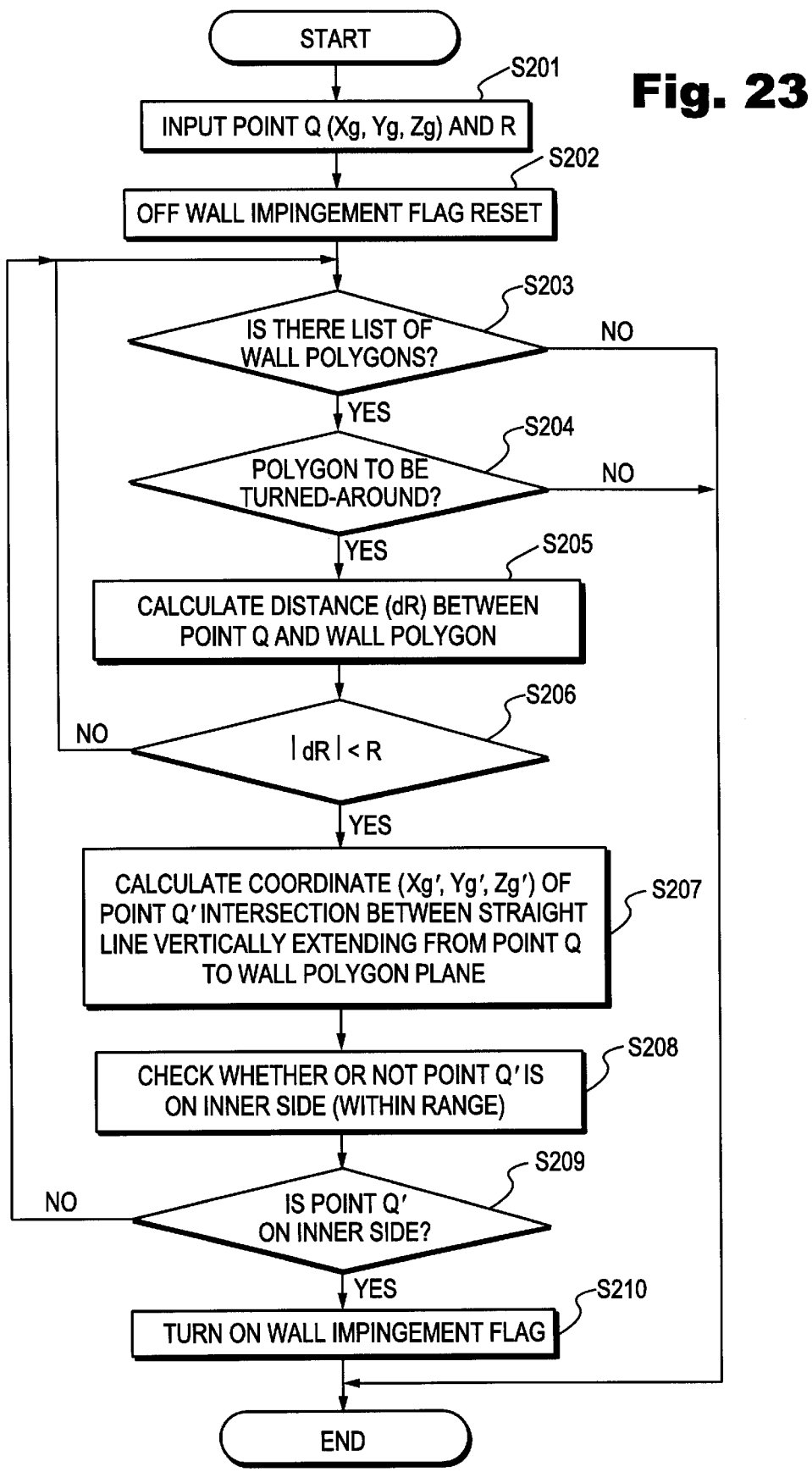
FIG. 23 is a flowchart showing a collision-determining routine.
Figure 25:
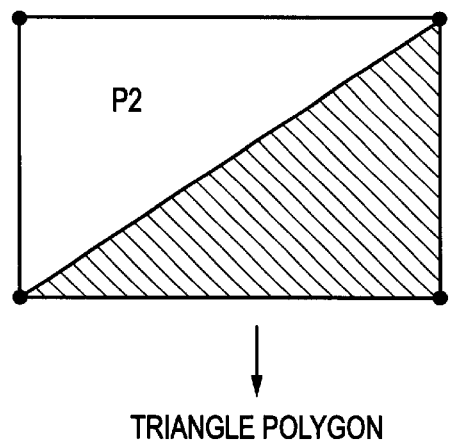
FIG. 25 is an illustrative view showing triangular polygon.

FIG. 23 shows step S103, i.e., an illustrative collision-determination routine, in detail. Before explaining this collision-determination routine, reference is made to FIG. 24 and FIG. 25, which show exemplary wall data to be collision-determined. That is, wall data is depicted as in FIG. 24, wherein triangular polygons as in FIG. 25 are gathered together. These respective polygons are stored as a listing of wall polygons in memory.

At a first step S201 in FIG. 23, a point Q (Xg, Yg, Zg) and a radius R are input. Incidentally, the point Q is a point to be checked and the radius R is a distance considered to be collisional. At step S202, a wall-impingement flag is then reset. At a step S203, it is determined whether or not the wall-polygon list identified above is stored in memory. If a wall polygon list exists, it is determined at a next step S204, whether or not the polygon under consideration is a polygon to be processed by turning around of the camera. If so, the process proceeds to a step S205.

At step S205, the distance (dR) between the point Q and the plane of the wall polygon is calculated according to Equation (2).

$$dR=Axg+Byg+Czg+D \tag{2}$$

Then at a step S206 it is determined whether or not the distance dR calculated at the step S205 is smaller than the radius R. When the distance dR is greater than the radius R, there is no collision between Mario and the wall, and accordingly the process branches back to step S203.

Figure 27:
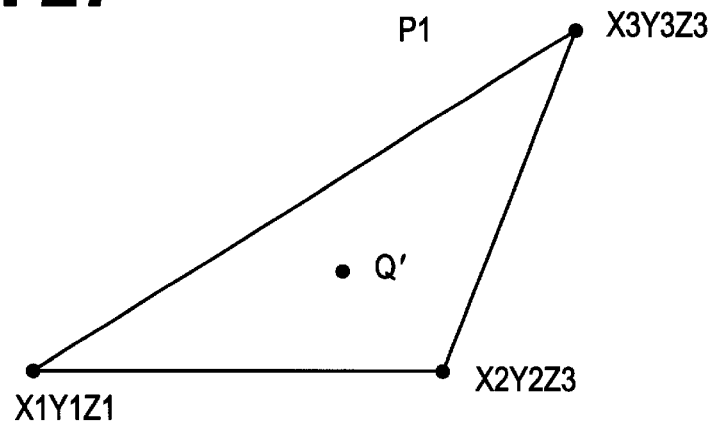
FIG. 27 is an illustrative view showing a state that a projection is onto a YZ plane.

If step S206 indicates that |dR|<R, a calculation is made at step S207 according to Equation (3) for determining the positional coordinate (Xg', Yg', Zg') of a point of intersection Q' (FIG. 27) between a straight line extending from the point Q vertically to the wall polygon P and the plane of the wall polygon.

$$Xg' = Xg + A \times dR \tag{3}$$
$$Yg' = Yg + B \times dR$$
$$Zg' = Zg + C \times dR$$

Figure 26:
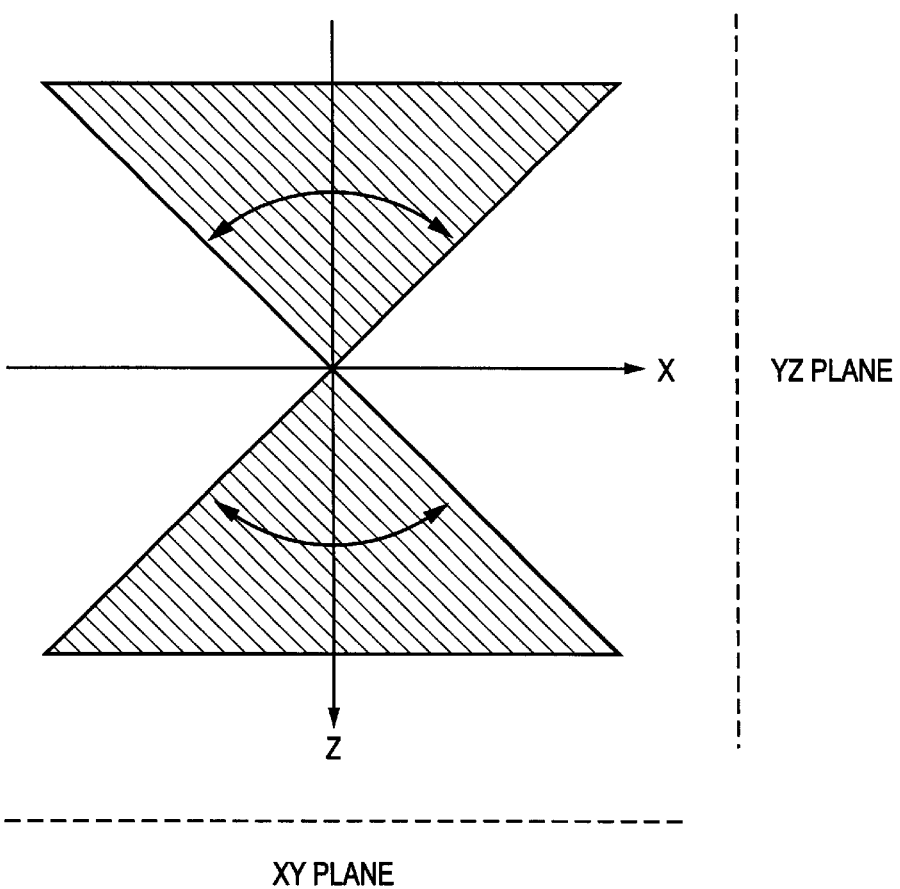
FIG. 26 is an illustrative view showing a projected surface.

Then at step S208, it is determined whether or not the point Q' is on the inner side of the polygon (within range). At step S208, it is determined onto which plane projection is to be made in dependence upon the direction of the wall (a value A). That is, when A<−0.707 or A>0.707, projection is onto a YZ plane shown in FIG. 26. Otherwise, the projection is onto an XY plane. Where the projection is onto the YZ plane, it is determined whether or not in FIG. 27 the point Q' is on an inner side of the polygon P1.

Figure 28:
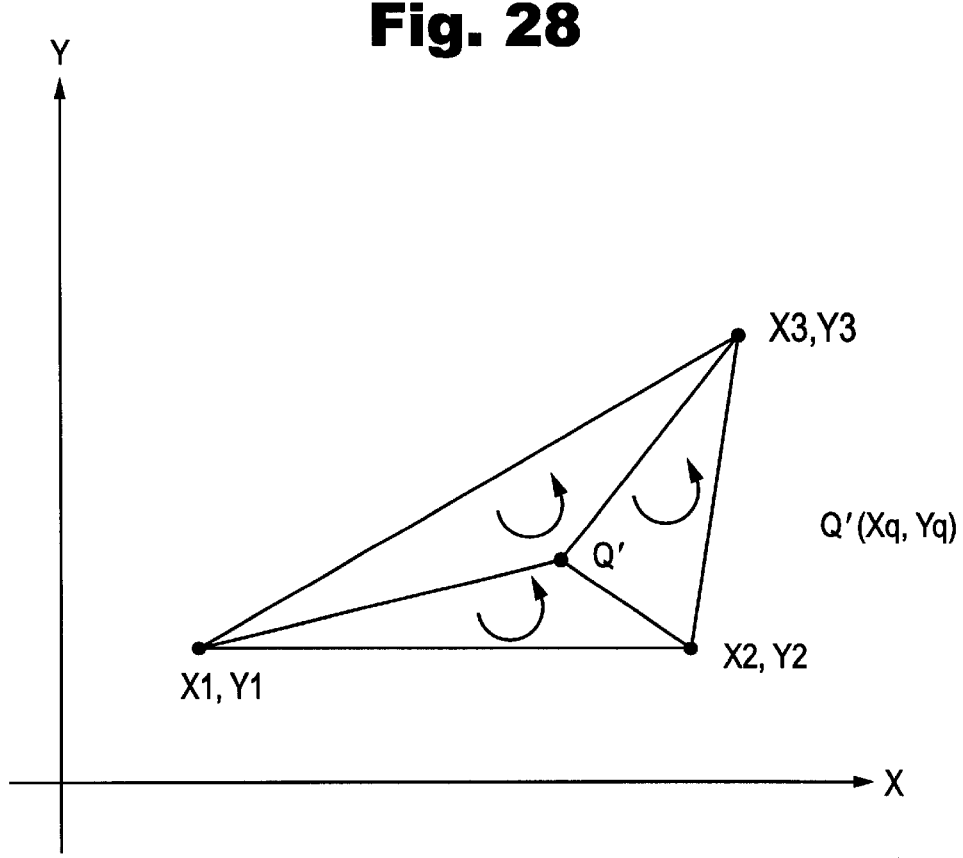
FIG. 28 is an illustrative view showing a state that a projection is onto an XY plane.

Meanwhile, where the projection is onto the XY plane, it is determined on the point Q' and apexes of the polygon P1 in FIG. 28 whether the value of counterclockwise cross product is positive or negative. That is, when C in the polygon-plane equation is $C \geq 0$, if each of the resulting cross products is 0 or negative, then determination is that the point Q1 is on the inner gide of the polygon P.

$$(Y1 - Yq) \times (X2 - X1) - (X1 - Xq) \times (Y2 - Y1) \leq 0 \quad (4)$$
$$(Y2 - Yq) \times (X3 - X2) - (X2 - Xq) \times (Y3 - Y2) \leq 0$$
$$(Y3 - Yq) \times (X1 - X3) - (X3 - Xq) \times (Y1 - Y3) \leq 0$$

Meanwhile, when $C<0$, if each of the resulting cross products is 0 or positive, then determination is that the point Q' is on the inner side of the polygon P.

$$(Y1 - Yq) \times (X2 - X1) - (X1 - Xq) \times (Y2 - Y1) \geq 0 \quad (5)$$
$$(Y2 - Yq) \times (X3 - X2) - (X2 - Xq) \times (Y3 - Y2) \geq 0$$
$$(Y3 - Yq) \times (X1 - X3) - (X3 - Xq) \times (Y1 - Y3) \geq 0$$

In this manner, the point Q' is checked at the step S208 as to whether it is on the inner side of the polygon or not, and thus within range. Based upon this check at step S209, it is determined whether or not the point Q' is on the inner side of the polygon. If "Yes" at this step S209, the wall-impingement flag that had been reset at the aforesaid step s202 is set (step S210). Thereafter the process returns to FIG. 22.

Note that the above stated collision-determination is merely one example, and it should be recognized that the collision-determination is possible by other methods as would be understood by those skilled intheart.

Referring back to FIG. 22, after the collision-determination at step S103, it is determined at step S104 whether or not the wall-impingement flag is set. If "No" at this step S104, the process of turning around is unnecessary, so that the No. n of a point to be checked is incremented at step S105 and the routine branches back to step S102.

Figure 29:
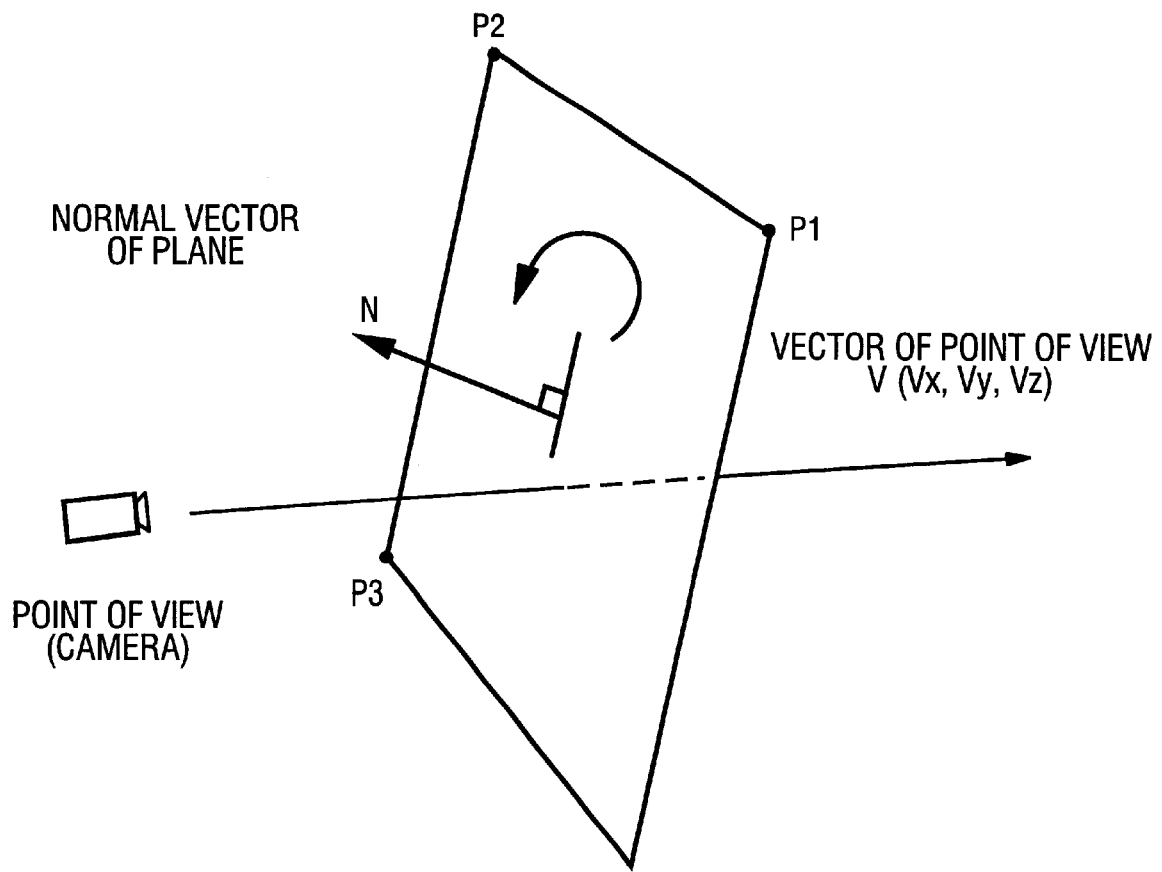
FIG. 29 is an illustrative view showing a normal vector of the plane and an point of view vector of the camera.

If step S104 indicates that the wall impingement flag is set, it is determined at a step S106 and a step S107 whether it is on a back side of the wall. That is, the directionality of the polygon is determined. Whether the polygon is directed to the camera (the point of view) or not can be determined by examining the sign of the dot product of a normal vector N and an eye (point of view) vector V in FIG. 29. The conditional expression therefore is given by Equation 6.

$$A = V \cdot N = VxNx + VyNy + VzNz \quad (6)$$

Figure 30:
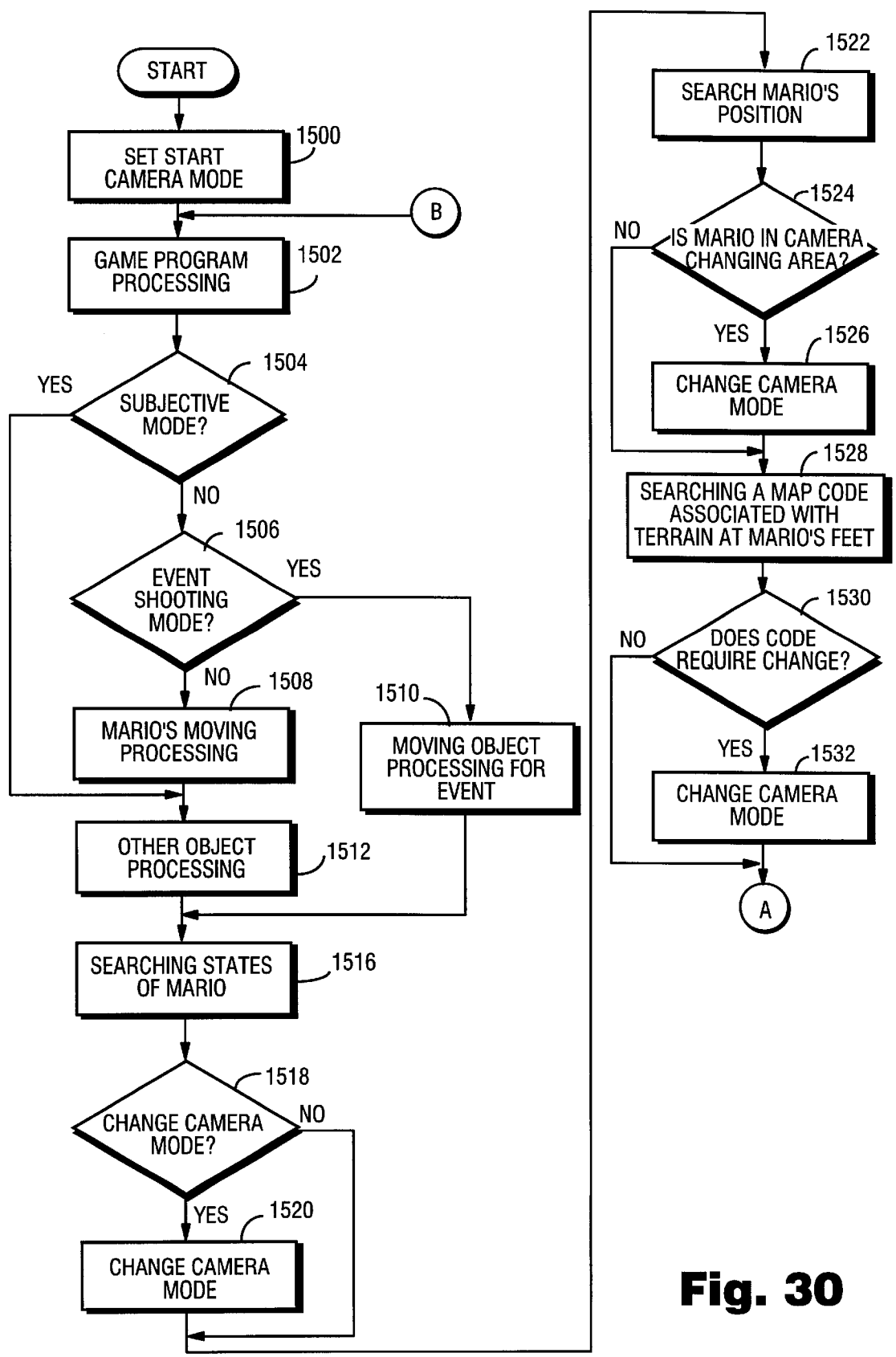

With Equation (6), determinations are respectively possible such that if $A>0$, the wall is directed to the camera (frontward) while if $A<0$, the camera is directed to a backside of the wall. If a plane existing between the camera and Mario is directed frontward relative to the camera, the turning-around of camera in FIG. 30 is not done. In this case, the No. n of the point is incremented at step S105, and the process branches back to the step S102.

If the plane between the camera and Mario is directed backward, the answer to the check at S107 is "Yes", and the turning-around process is carried out at subsequent steps S108 and S109. At step S108, the angle of movement through which the position of camera (photographing position) is altered is based on the flat-plane equation for the wall. That is, the flat-plane equation in terms of three points P1 (X1, Y1, Z1), P2 (X2, Y2, Z2), P3 (X3, Y3, Z3) on the flat-plane equation is expressed by a multi-term equation of Equation (7).

$$Ax + By + Cz + D = 0 \quad (7)$$

where, $$A = Y1(Z2 - Z3) + Y2(Z3 - Z1) + Y3(Z1 - Z2)$$
$$B = Z1(X2 - X3) + Z2(X3 - X1) + Z3(X1 - X2)$$
$$C = X1(Y2 - Y3) + X2(Y3 - Y1) + X3(Y1 - Y2)$$
$$D = X1(Y2Z3 - Z2Y3) +$$
$$Y1(Z2X3 - X2Z3) + Z1(X2Y3 - Y2X3).$$

The angle Ry of the normal vector with respect to the Y-axis is given by Equation (8).

$$Ry = \tan^{-1}(A/C) \quad (8)$$

Therefore, the turning-around angle of camera is either $Ry+90°$ or $Ry-90°$. That is, at step S109 the camera is rotationally moved about Mario, or the operable object, in either direction $Ry+90°$ or $Ry-90°$. Specifically, the movement is to a location closer to the presently-situated camera position (C in FIG. 21).

The present methodology advantageously provides a wide range of camera modes, both automatic and user controlled. For example, one camera control key automatically causes the three dimensional world display from the perspective of the camera disposed above and behind the player controlled character, e.g., Mario. Depending upon obstacles in the way or the size of a particular room, the camera may not move right behind Mario. As will be explained more fully below, a player can control moving in for a close up or pulling back for a more distant view. Also, it is possible to move the camera right and left to change the angle to enable the player to see more of the course in which Mario is presently disposed.

It is also useful for a player to manipulate the camera control keys to better judge jumps or determine more precisely where an object is located in relation to Mario. By striking a predetermined control button, one can switch to a perspective that is always adjusted to being right behind Mario. This mode is useful on very narrow platforms, and in enclosed spaces. One can switch between wide angle and close-up and can pan left or right, but ultimately the camera returns to right behind Mario in such a camera mode. A fixed perspective camera mode allows a user to have an objective view as Mario jumps around the courses as opposed to the subjective view from Mario's perspective. If the camera were disposed in one spot, Mario can appear to run out of sight extremely fast. In a look around camera mode, a player can come in for an extreme closeup, and move Mario's head around to scan the entire surroundings using the control joystick. This look around camera mode permits the user to look everywhere, including up to see how huge the level is or to look down over a cliff to see if there are any objects not viewable previously, or to look off in the distance to discover coins. The present methodology of supplying the user with the ability to selectively choose camera angles, permits the user to perform better in the game. By moving the camera back, it is possible to get a better feel for what is ahead. By panning left and right, the user can gain a better angle to attack a jump, navigate a narrow ledge or see what is around the corner. By changing Mario's perspective, it is possible to increase the obtainable degree of agility and precision. If a cliff or a high tower is associated with Mario's present position, by changing the camera angle to look down and to the side, for example, it is possible to view aspects of the course which were not viewable previously. The automatic and user controlled camera modes are explained in detail together with additional character control and animation features in a provisional application filed on Apr. 9, 1997, entitled "Video Game System and Method With Enhanced Three-Dimensional Character and Background Control" naming Miyamoto et al as inventors (attorney docket no. 723-487), which application is incorporated herein by reference. The additional character control and animation features in this incorporated application are part of the video game methodology contemplated for use with the subject matter expressly described herein.

FIGS. 30 and 31 are a flowchart delineating the sequence of operations performed during camera mode processing. As indicated at block 1500, an initial camera mode is set. The initial camera mode set may vary depending upon the particular game status from which the game is starting. Thus, the initial camera mode may be modified depending, for example, on what course or level is being entered, to thereby set the camera mode to the best available automatic camera mode for the particular portion of the game resumed upon initialization. As indicated at block 1502, other game program processing is then performed in addition to camera mode control, such as display generation, tallying the number of stars and coins attained, etc. A check is then made at block 1504 to determine whether the camera mode is the subjective mode, as indicated, for example, by the state of a subjective mode flag. The subjective camera mode indicates that the camera mode perspective is from the subjective point of view of the player-controlled character, e.g., from directly behind the head of Mario. If the current camera mode is the subjective mode, then the routine branches to perform other object processing 1512, to thereby skip Mario's movement processing, since Mario is not displayed as moving or otherwise in the subjective mode.

If the current camera mode is not in the subjective mode, then a check is made to determine whether the current camera mode is in the event shooting mode (1506). The event shooting mode is a camera mode in which, for example, a sequence of display frames is generated to dramatize the discovery of a star by a player. This mode also encompasses display sequences associated with game title screen and ending screen demonstrations. The event shooting mode may be triggered by any predetennined game event. If the camera mode is the event shooting mode, then Mario's movement (i.e., the player controlled object) and the movement of "enemy characters" are stopped to thereby maintain the relative positioning between Mario and an enemy prior to the event detection (1510). Additionally, in the event shooting mode, different moving objects are generated in accordance with the event detected, e.g., star generation and celebration display sequence.

If the check at 1506 indicates that the system is not in the event shooting mode, then normal game processing movement of Mario and other objects take place (1508, 1512). Thus, in accordance with the processing at 1508, 1512, normal game play control of Mario and enemy movement occurs.

After the object processing in 1512, the program enters into a camera mode changing sequence of operations. Initially, a search is made of the states of Mario to determine whether Mario is in a state of jumping, swimming, flying, etc. (1516). There are three basic conditions which determine change in camera mode: (1) the state of Mario, (2) the position of Mario requiring a camera mode change and (3) the condition of the terrain or ground over or through which Mario passes, as determined by information associated with the detected terrain information at Mario's foot position.

Turning back to block 1516, after searching to determine the present state of Mario, a check at block 1518 determines whether the camera mode need be changed. Associated with the character Mario, is a stored indication of the objects present state, e.g., running 10, flying 13, etc. Depending upon the detected state of Mario, a determination is made as to whether such a state requires a change in the camera mode. For example, if Mario is swimming, the camera mode is switched to optimize the view of the water-filled terrain. If the check at block 1518 indicates that the camera mode needs to be changed because of Mario's state, then the camera mode is changed accordingly (1520).

After changing the camera mode at 1520, or if the camera mode need not be changed as determined at 1518, a search is made as to Mario's display position (1528). Associated with the character Mario is a stored indication of his coordinate position in the current display frame. Based on the check of Mario's position on the display screen, as will be explained further below, a determination is made as to whether Mario's current position indicates that the camera mode should be changed (1524). If the current position check indicates that the camera mode should be changed then, as indicated at block 1526, the camera mode is changed. See FIGS. 34A–C, 35A and 35B and the related camera mode description set forth below.

The game program then initiates a search of the map code, then associated with Mario (1528). The map code indicates the current terrain associated with Mario's feet to indicate, for example, whether Mario is on a slippery slope or is under water, etc. A check is then made as to whether the current map code requires a camera mode change (1530). If the current map code check indicates that the camera mode needs to be changed, then such change is initiated (1532).

Turning to FIG. 31, a check is then made to determine whether a predetermined important game event is taking place (1534). If it is determined that a predetermined important event has taken place, then the mode is switched to event mode (1536). If a predetermined important event has not been detected as having taken place, then the routine branches to block 1538 where a check is made as to whether the routine is in the event shooting mode. If the camera mode is in the event shooting mode, then camera processing for the event is initiated (1542) and the routine branches to block 1562 in which Mario and other objects are displayed in accordance with the predetermined event.

If the check at block 1538 reveals that the routine is not in the event shooting mode, then a check is made at block 1540 as to whether the camera mode is currently in the subjective mode. If the camera mode is in the subjective mode, then the camera shooting direction is modified, as previously described, to be from Mario's personal perspective (1544). In the subjective mode, the manipulation of the controller joystick results in turning Mario's head and the shooting direction is changed accordingly (1546). A check is made at block 1548 to determine whether the subjective mode is ended. If so, the subjective mode is concluded, the subjective mode flag is turned off (1550), and processing continues by displaying Mario and other objects (1562).

If the check at block 1540 reveals that the current camera mode is not the subjective mode, then a check is made to determine whether any of the C buttons on the controller have been pressed (1552). As previously described, the controller C buttons are shown in FIG. 6 as buttons 404 C–F. If one of the C buttons has been depressed, a check is made at block 1554 to determine whether it is necessary to change to the subjective mode. If the C button depression indicates that a change should be made to the subjective mode, then such a change is initiated (1558) and the routine displays Mario and other objects in accordance with the then active camera mode at 1562. If there has not been a change to the subjective mode as indicated by the check at block 1554, then the direction of the camera and the apparent physical disposition of the camera is changed in accordance with the particular "C" button depressed (1556). After camera processing at 1560 has been completed to change to the new camera perspective, Mario and other objects are displayed in accordance with the new point of view (1562). The depression of particular C buttons modifies the apparent distance and/or angular relationship between the camera and Mario.

After camera processing in block 1560 and in accordance with the various camera modes described herein, Mario and other objects are displayed in accordance with the particular camera mode and the routine branches back to block 1502 in FIG. 30 for normal game program processing and the camera mode processing continues in accordance with the previously described methodology.

Figure 32A:
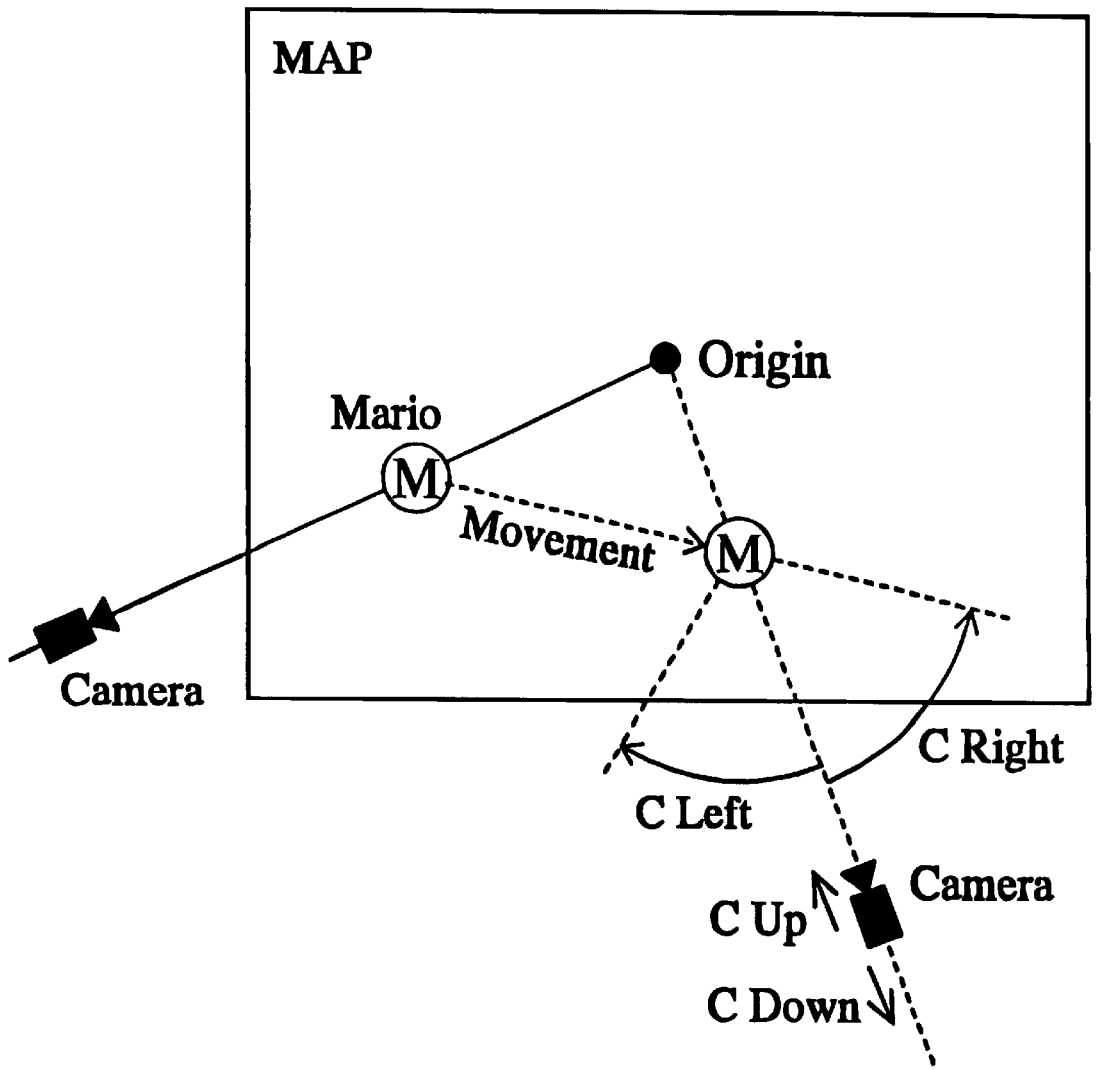
FIGS. 32A–32E depict exemplary camera modes.
Figure 35A:
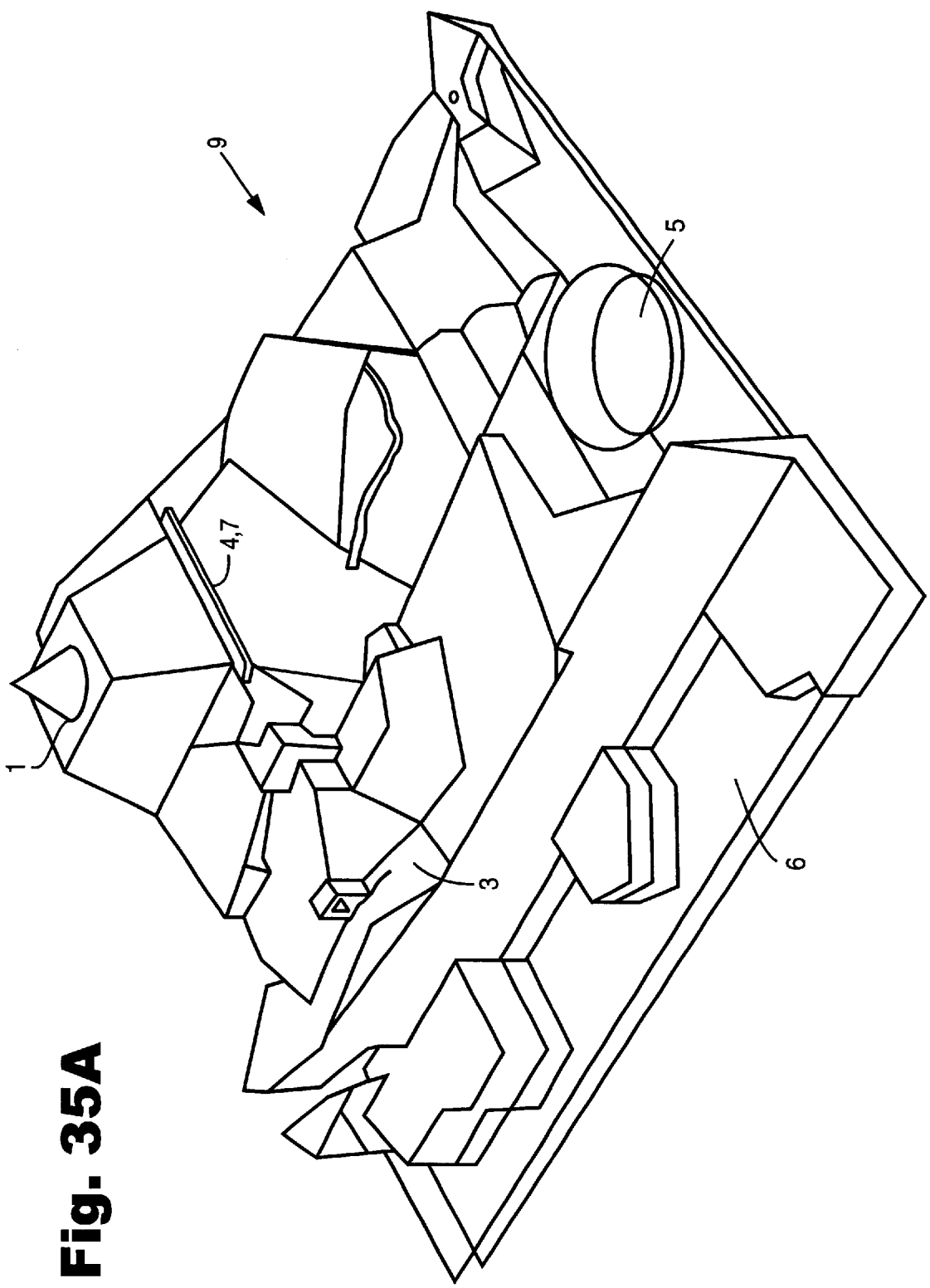
FIGS. 35A and 35B depict exemplary topographical surfaces and associated camera modes.
Figure 35B:
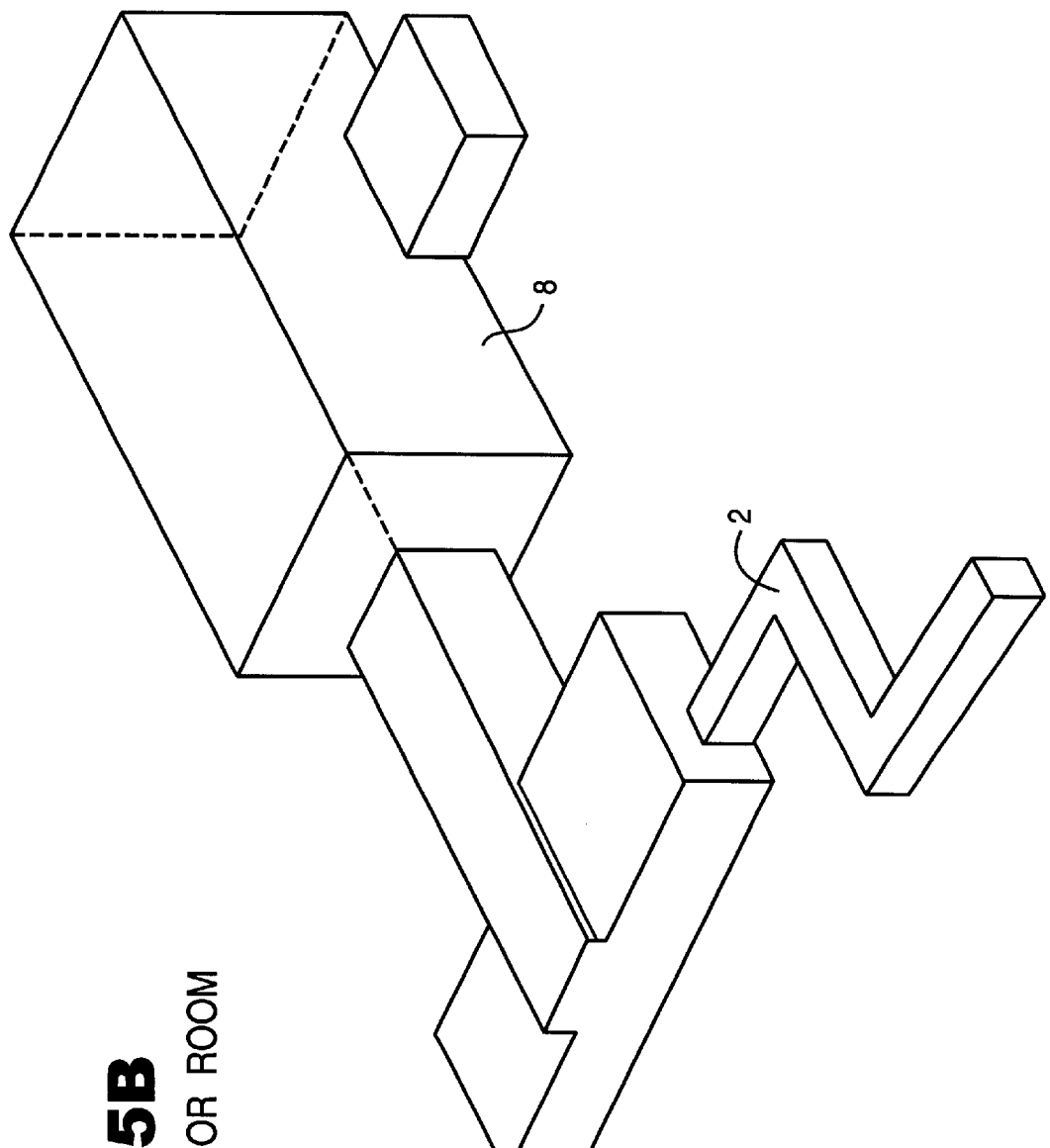

In the normal camera processing such as indicated in block 1560, the video game system is programmed to generate nine camera mode patterns, where program controlled switching from one mode to another occurs dependent upon Mario's detected condition or position in the three dimensional world course. Although nine camera patterns or modes are described below, it should be understood that the number of camera position patterns are given by way of example only, and should not be construed as limiting in any way. FIGS. 32A–32E visually portray five of the nine camera position patterns in accordance with the present methodology. These various modes are automatically invoked when a player is in course positions such as is shown in FIGS. 35A and 35B. It should be understood that the depiction of the camera represents the point of view in the displayed three dimensional world which is utilized in processing calculations for creating display frames in the particular camera position mode. In a particular mode, by depressing the C button on the controller shown in FIG. 6, the player can further modify the camera perspective as described below. For example, FIG. 32A depicts camera mode pattern 1 (which is referred to as the tower camera mode), where the circled "M" represents Mario, whose movement is indicated by the dashed line in FIG. 32A. From the first position indicated to the second position indicated, the apparent camera perspective changes with Mario's movement with the line of view of the first and second positions intersecting at the identified origin. With Mario at the point indicated in FIG. 32A by the arrow, if the left C button is depressed, the camera swings 60 degrees to the left of the center of Mario as shown. Similarly, if the right C button is depressed, the camera swings 60 degrees to the right of the center of Mario. If the C up button is depressed, the camera gets close to Mario, and if the C down button is depressed, the camera pulls away from Mario.

Figure 32B:
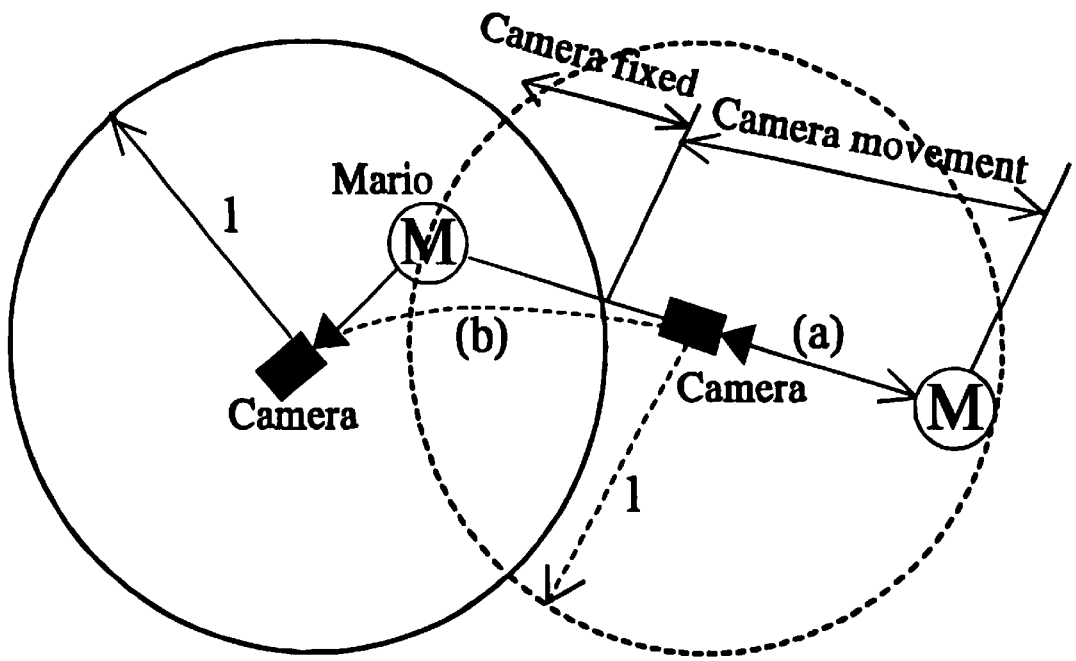

FIG. 32B shows a second camera mode (camera mode 2), which is referred to as the dungeon camera mode. In this mode, as the the character being controlled, e.g., Mario, is moved, the displayed camera view appears to chase Mario. If Mario exceeds a fixed distance from the camera, the camera moves to follow Mario. If the joystick is not used to control Mario, the camera view appears to automatically circle to the back of Mario. In FIG. 32B, the solid line with the arrowhead indicates the locus of Mario's movement, the dashed line indicates the locus of the camera, and the "small 1" indicates the maximum distance between the camera and Mario. Camera mode 3 is the slide camera mode in which the camera always is always located at the back of Mario. In this mode, Mario travels in one direction, and generally not in the reverse direction.

Figure 32C:
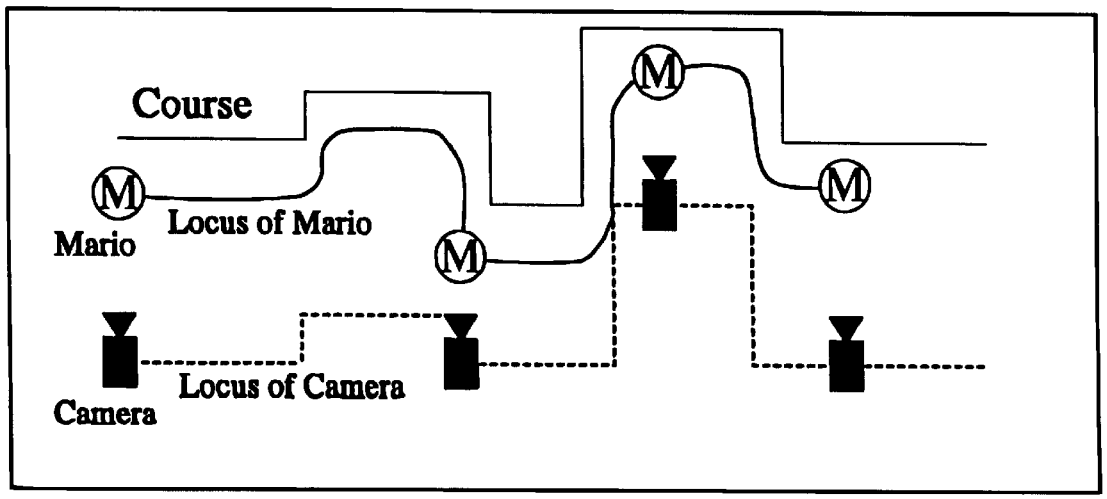

Camera mode 4 is referred to as the "parallel tracking" mode and, as shown in FIG. 32C, the camera always moves in parallel with the course. When Mario moves deeper into the course, the camera chases Mario in parallel with the course. The camera mode may be switched to parallel tracking camera mode 4 for example under conditions when Mario is traversing a narrow bridge.

Figure 32D:
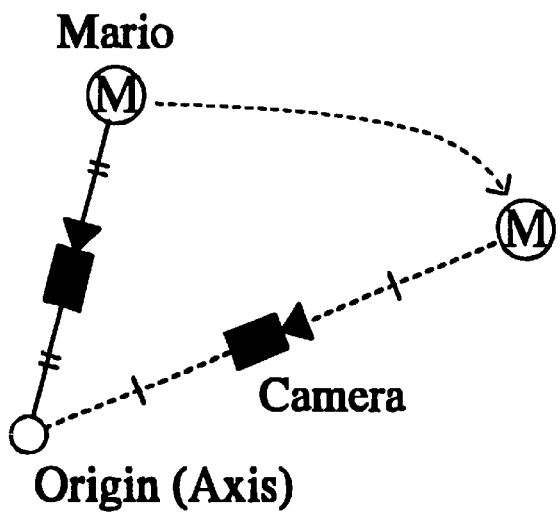

Camera mode 5 shown in FIG. 32D is referred to as the "fixed" camera mode. In this mode, the camera moves to a midpoint between the indicated origin point and Mario. The fixed camera mode provides a wider angled view of a course to ensure that an object will not be lost from the scene.

Camera mode 6 is the underwater camera mode. This mode is similar to the dungeon mode described above as camera mode 2. However, when Mario swims up the camera looks up at Mario and when Mario swims down, the camera looks down to Mario. In the underwater camera mode, when Mario stops, the camera automatically circles to the back of Mario.

Camera mode 7 is referred to as the VS camera mode. This mode is the same as the parallel camera tracking mode 4 shown in FIG. 32C. However, when two characters separate the camera pulls away from the two characters to display them on the screen. When the two characters approach, the camera gets close to them.

Figure 32E:
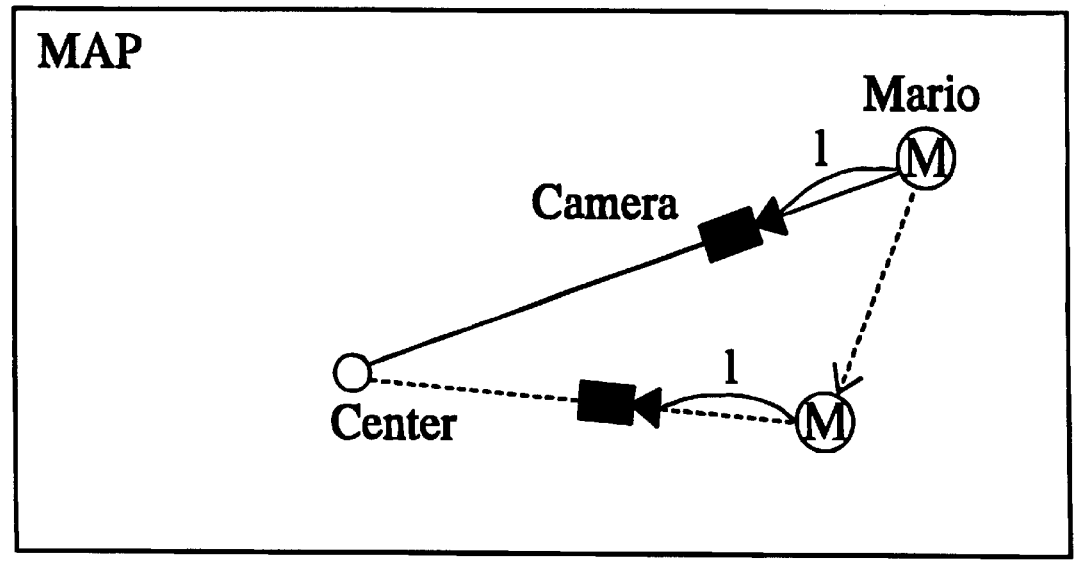

Camera Mode 8 is shown in FIG. 32E and is referred to as the opposite tower camera mode. This mode is similar in principle to the tower camera mode 1. As indicated in FIG. 32E, the distance between the camera and Mario remains a fixed distance L. The ninth camera mode is referred to as the flight camera mode. This mode is similar to the underwater camera mode 6.

FIG. 35A and B depicts portions of two display screens and show the associated camera mode that will be switched on depending on the detected position of Mario. For example, if Mario is detected at the top of the tower, as indicated by the "1" in FIG. 35A, then the tower camera mode perspective is generated. If Mario is detected as being on the polygon representing a narrow ledge, then the parallel tracking camera mode 4 is switched to as indicated in FIG. 35A. If Mario is flying in the air then the flight camera mode 9 is switched.

Figure 33A:
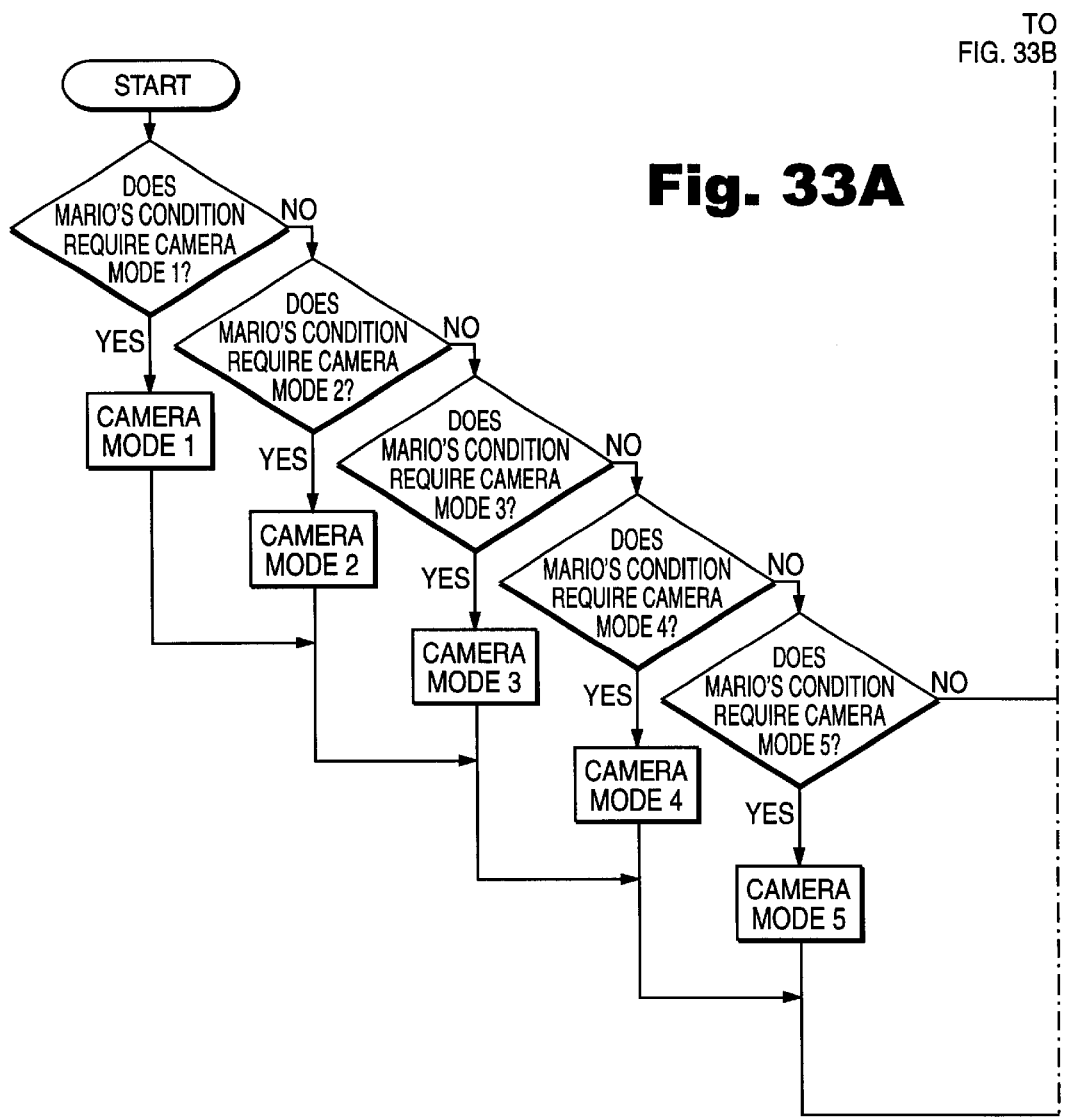
FIGS. 33A and 33B are a flowchart indicating how the camera mode is automatically controlled to change dependent upon a detected condition of Mario, or upon detecting Mario being in a particular situation.
Figure 33B:
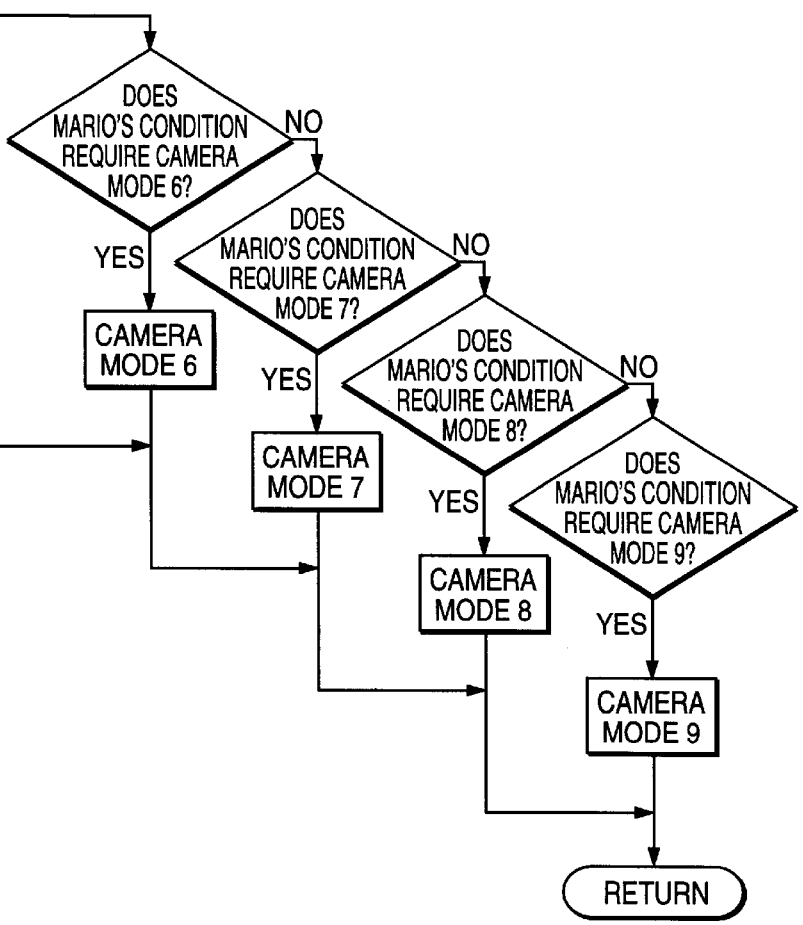

In many of the modes 1–9, as noted above, a players can change the viewpoint between the subjective mode and the objective mode by depressing the C buttons. A change in modes is also switched as the course changes. For example, when Mario passes through a door, or dives into the water, the modes automatically switch. FIGS. 33A and 33B are a flowchart indicating how the camera mode is automatically controlled to change dependent upon a detected condition of Mario, or upon detecting Mario being in a particular situation. The camera mode changing routine begins by checking as to whether Mario's condition or situation requires camera mode 1. If so, the camera processing automatically switches to generating displays from the perspective of camera mode 1. Upon completion of camera mode 1 processing, the routine branches back to the calling routine. If Mario's condition does not require camera mode 1, then a check is made as to whether Mario's condition requires camera mode 2. If so, then the routine generates displays in accordance with camera mode 2 as explained above. This process is repeated for each camera mode. With each check, the routine determines whether Mario's condition requires one of the respective nine camera modes, which checks are repetitively made. Thus, in accordance with FIG. 33A processing, upon detecting that Mario has been controlled by the user to be in an underwater situation, the camera mode is automatically controlled to result in camera mode 4 operation.

With respect to FIGS. 33A and 33B, whether Mario's condition requires switching to a particular camera mode is determined by monitoring the stored condition or status of Mario, and determining whether such stored condition or status is indicative of the conditions or status desired to initiate one of the nine camera modes. As explained in conjunction with FIG. 30, stored information relating to Mario's state condition and terrain, are utilized to control switching into one of the automatic camera modes. The precise conditions utilized to switch to one of the particular modes may be selected by the game designer depending upon a particular application. Moreover, on top of the automatic program control camera mode perspectives, the user has the flexibility to superimpose the four C button operations to result in changing the camera's perspective as described above in conjunction with FIG. 32A.

As described in detail above, a wide variety of camera perspective options are available both under player control and under automatic program control. FIGS. 32F–L exemplify displays which may be generated by a player actuating one of the FIG. 6 control keys to initiate a change in camera perspective. FIG. 32F shows the character Mario in the center of a three dimensional scene. By depressing the left and right keys as indicated by the arrows which correspond to 404F and 404E of FIG. 6, the displays in FIG. 32H and 32J are generated to simulate circling left and right around Mario. If keys 404C and 404D are actuated (the up and down arrow keys), the displays shown in FIGS. 32I and 32G are generated which simulate the effect that the camera angle or point of view appears to pull away from Mario or get close to Mario. Focusing on FIG. 32G, if the control stick is manipulated from the close up viewpoint shown, Mario's head turns and the viewpoint follows Mario's line of sight, as shown in FIGS. 32L and 32K. By "looking around" and manipulating Mario's head in this manner, it is possible to observe objects which would otherwise not be seen to enhance the players ability to achieve goals.

During game play, depending on the scene, the camera mode automatically switches to the optimum view as described above. If a player presses the "R" button, a change may be made to a special camera mode. There are two optional camera modes that can be set from the pause screen as explained above during the pause processing description. On the pause screen, a player is able to select one of two optional modes. By pressing the "R" button, the player is able to switch between these camera modes. When operating in these modes, the same controls are available as previously described in conjunction with FIGS. 32F–32L. In one embodiment of the present invention, the distance between Mario's current position and the camera is displayed. If the player presses and holds the "R" button to halt the camera movement, the camera position is fixed, which is useful when it is not desired for the camera to follow Mario. By releasing the "R" button, the camera mode will return to its normal state.

Figure 34A:
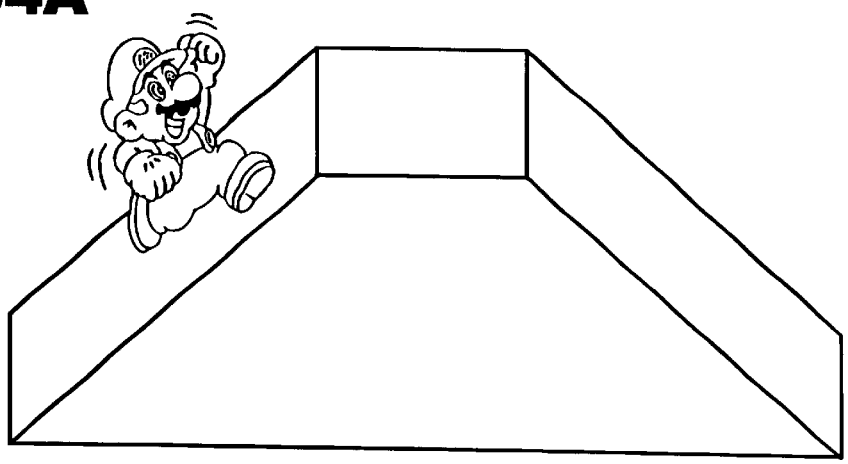
FIGS. 34A–34C show a player controlled character on surfaces having different slopes.
Figure 34B:
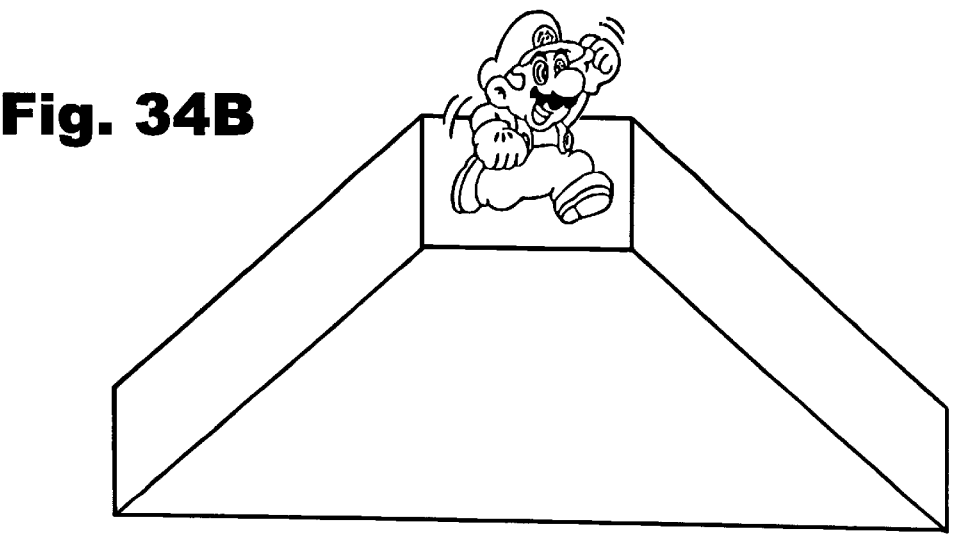
Figure 34C:
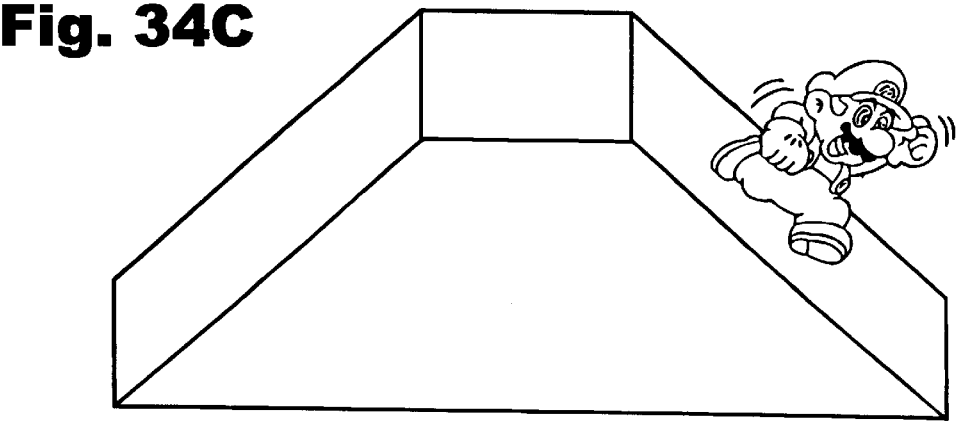

FIGS. 34A–C shows Mario traversing terrains having three different slopes, i.e., an upwardly sloping terrain with respect to Mario's motion direction, a level horizontal surface, and a downwardly sloping terrain with respect to Mario's motion direction, respectively. As can be seen in FIGS. 34A–C, each of the terrains identified is associated with a polygon on which Super Mario's feet contact. Such polygons may, if desired, have associated desired camera mode indicators stored. In such cases, when Mario is detected as being on such a polygon bounded terrain, a camera mode switch is initiated, as previously described in conjunction with FIG. 30.

Figure 36A:
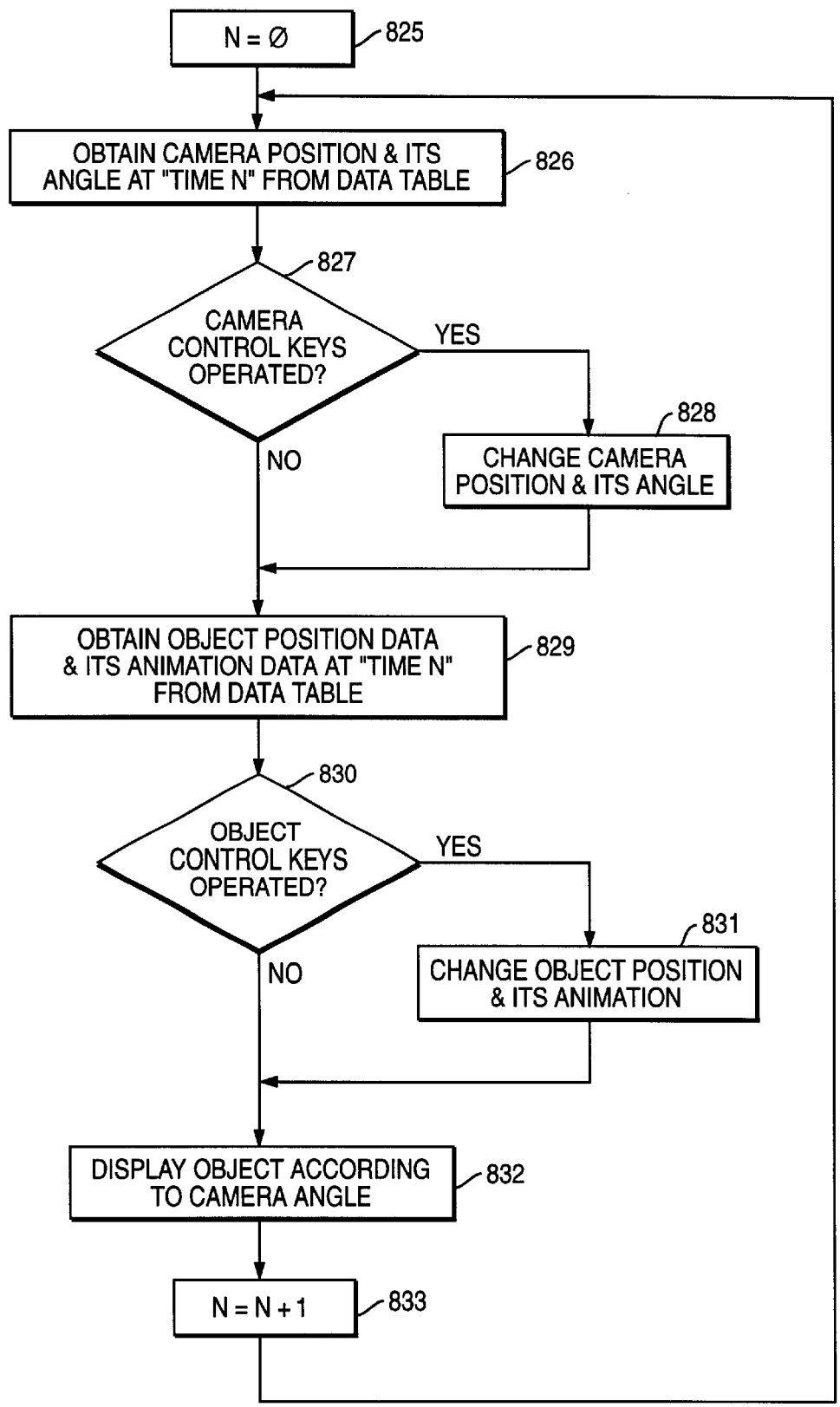
FIG. 36A is a flowchart relating to title screen or special event processing.
Figure 36B:
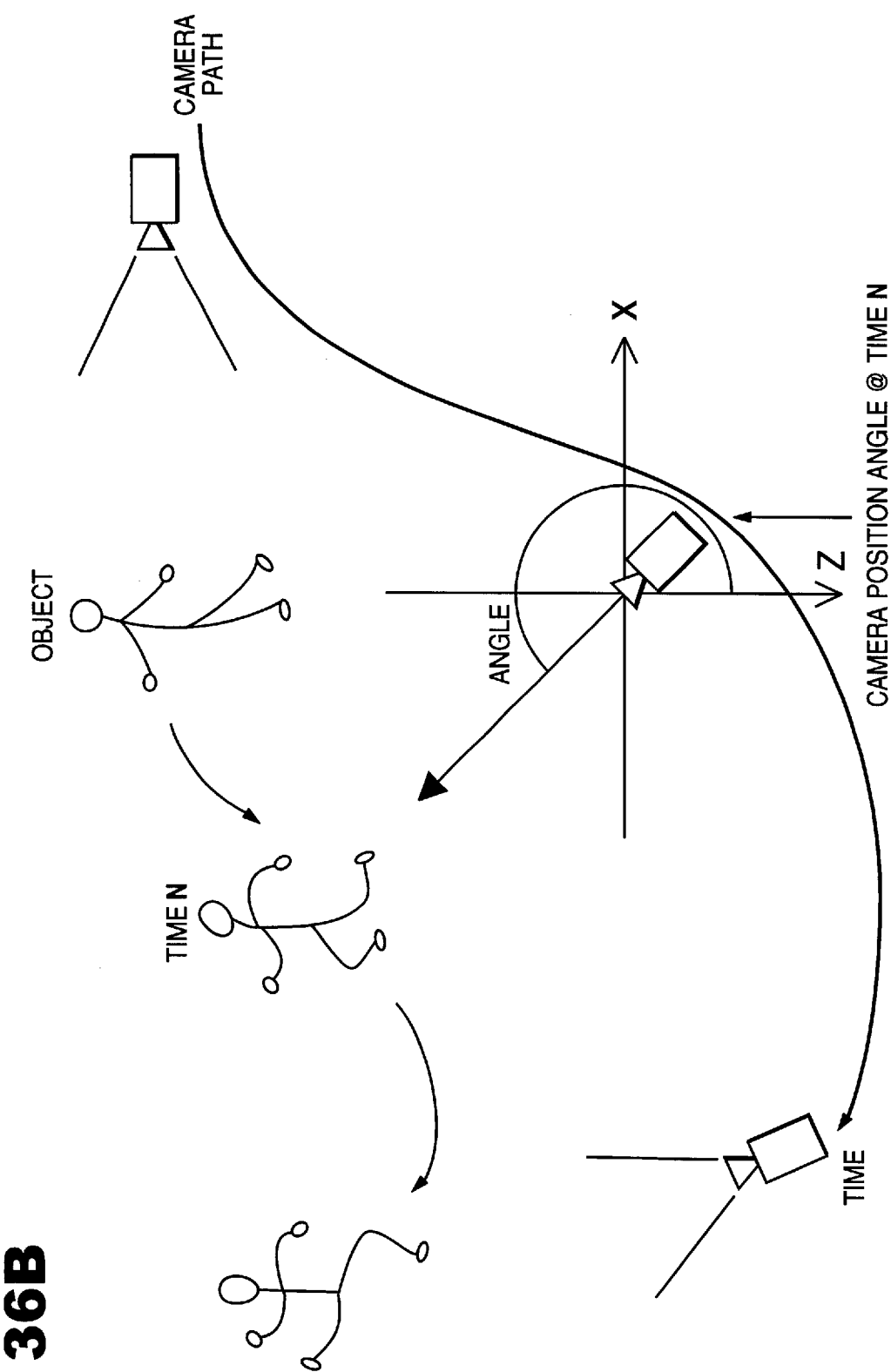
FIG. 36B shows an exemplary animated object and the apparent locus of the camera path following the object relating to the FIG. 36A flowchart.

FIG. 36A is a flowchart relating to changing the camera perspective for special event processing as well as title screen processing, end of the game demonstrations and demonstrations for which it is desired to permit a player to manipulate a displayed character. FIG. 36B shows an animated object and the locus of the "camera" path (displayed point of view) which appears to be following the object. During one exemplary embodiment of special event, title and game ending demonstrations, the camera position is determined as a function of time. At a given time "N", as shown in FIG. 36B, the camera has an associated camera position angle and a displayed character has associated position and animation data. In demonstrations, such as during title screen processing, a player's random controller operations affects the apparent "camera" position. A player is able to move the camera up, down or in different directions.

As shown in FIG. 36A, at the beginning of a demonstration, the time N is set equal to zero (825),. Thereafter, the game processor accesses the camera position and its angle at time N from a data table in memory (826). A check is then made at 827 to determine whether the controller's "camera" controlling "C" buttons have been operated. If so, then the camera position and angle are changed accordingly, in a manner which is described below (828). If the check at block 827 indicates that the camera control keys have not been operated, then object position control is initiated such that the game program processing system accesses the object position and animation data at time N from the data table in memory (829). A check is then made to determine whether a FIG. 6 object control key/joystick has been operated (830). If an object control key or joystick has been operated, then the object position and its animation are changed in accordance with the player control input (831). After the processing at 831, in which the object position and animation data are changed, or if no object control key or joystick has been manipulated, the object is displayed in accordance with the previously obtained camera position and angle (832). Thereafter, the time N is incremented in an associated counter (833) and the routine branches back to block 826 to repetitively continue the title screen processing or other demonstration processing until, for example, in the case of title screen processing, the player chooses to begin game play.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A video game system comprising:
 a detachably connectable external memory for storing a video game program;
 a game program executing processing system, including a connector for receiving said connectable external memory, and for executing said video game program to generate a three-dimensional world display;

at least one player controller operable by a player including a plurality of camera perspective control keys for generating video game control signals for modifying the displayed three-dimensional world point of view; said external memory including instructions for causing said game program executing processing system to respond to the player's actuation of each of said plurality of camera perspective control keys by modifying the displayed three-dimensional world point of view, wherein said external memory includes instructions for detecting whether an object exists between the player controlled character and a current point of view perspective such that the player controlled character would not be visible on a display screen and changing the current point of view such that the player controlled character will be displayed.

2. For use in a video game system having an external memory for storing a video game program, a game program executing processing system for executing said video game program, at least one player controller operable by a player for generating player controller related data, said player controller having a plurality of point of view control switches, a method of operating of said video game system comprising the steps of:

generating a first three-dimensional world display from a first point of view in which a player-controlled character is depicted in the three-dimensional world;

detecting if any one of a plurality of point of view control switches on said player controller have been depressed by a player;

generating a second three-dimensional world display from a second point of view in response to the detection of the depression of one of said point of view control switches. said second point of view being different depending upon which point of view control switch was depressed by the player;

detecting whether an object exists between the player controlled character and a current point of view perspective such that the player controlled character would not be visible on a display screen; and changing the current point of view such that the player controlled character will be displayed.

3. For use with a video game system having a game program executing processing system for executing said video game program to create a display simulating a three-dimensional world, and at least one player controller having a plurality of control keys and operable by a player to generate video game control signals for controlling the display of a player controlled character, a portable storage device for controlling the operation of said video game system comprising:

a memory media for storing video game instructions and graphics data;

said video game instructions including instructions for causing said game program executing processing system to respond to the actuation of any one of a plurality of control keys of said player controller to execute instructions for changing the displayed point of view perspective in a displayed three-dimensional world in a manner depending upon which of said plurality of control kevs was actuated, wherein said video game instructions further include instructions for detecting whether an object exists between the player controlled character and a current point of view perspective such that the player controlled character would not be visible on a display screen and changing the current point of view such that the player controlled character will be displayed.

4. A portable storage device in accordance with claim 3, wherein said video game instructions further include instructions for detecting whether a special event has occurred and if so for automatically generating a display sequence in which the point of view perspective is changed.

5. For use in a video game system having an external memory for storing a video game program; a game program executing processing system for executing said video game program; at least one hand-held player controller embodied in a housing having a front surface and coupled to said game program executing processing system and including an operation control member for generating display data for a player controlled character, and processing circuitry for executing commands received from said game program executing processing system, said player controller having a plurality of point of view control switches, said operation control member and said plurality of control keys protruding from said front surface of said player controller housing, a method of operating said video game system comprising the steps of:

generating a first three-dimensional world display from a first point of view using said game program executing processing system in which a player-controlled character is depicted in the three dimensional world;

processing a command by said hand held player controller received from said game program executing processing system;

generating a second three-dimensional world display from a second point of view in response to the detection of a predetermined condition;

generating a third point of view display in response to the player actuating said operation control member when said display is depicting said second point of view, detecting whether an object exists between the player controlled character and a current point of view perspective such that the player controlled character would not be visible on a display screen; and changing the current point of view such that the player controlled character will be displayed.

6. A method according to claim 5, wherein said predetermined condition is the depression of one of said point of view control switches, said second point of view being a function of which point of view control switch was depressed by the player.

7. A method according to claim 5, wherein said step of generating a second three-dimensional world display includes the step of generating a second point of view display from the perspective of the player-controlled character.

8. A method according to claim 7, wherein said step of generating a third point of view display includes the step of changing the point of view to coincide with the apparent turning of the character's head by the operation control member.

9. For use with a video game system console having a game program executing processing system for executing said video game program to create a display simulating a three-dimensional world, and at least one hand-held player controller embodied in a housing having a front surface and a joystick control member protruding from said front surface and a plurality of control keys protruding from said front surface, said player controller including processing circuitry for executing commands received from said game program executing processing system, a portable storage device for controlling the operation of said video game system console comprising:

a memory media for storing video game instructions and graphics and sound data;

said video game instructions including instructions for causing said game program executing processing system to transmit a command to said player controller for execution by said player controller processing circuitry, and including instructions for causing said game program executing processing system to display a scene in a plurality of distinct camera modes, and instructions for causing said game program executing processing system to respond to the detection of a player controlled character being in a predetermined state and for changing the displayed point of view perspective in a displayed three-dimensional world in accordance with one of said camera modes wherein said external memory further includes instructions for detecting whether an object exists between the player controlled character and a current point of view perspective such that the player controlled character would not be visible on a display screen and changing the current point of view such that the player controlled character will be displayed.

10. A portable storage device according to claim 9, wherein said external memory further includes instructions for responding to the actuation of a predetermined control key for changing the displayed point of view perspective.

11. A portable storage device in accordance with claim 9, wherein said predetermined state is one which triggers the occurrence of a special event, and wherein said video game instructions further include instructions for automatically generating a special event display sequence in which the point of view perspective is changed at some point in the sequence.

12. A portable storage device according to claim 9, wherein said predetermined state is the state of the character being in one of a swimming state and a flying state.

* * * * *